US012330771B2

(12) United States Patent
Skarolek et al.

(10) Patent No.: US 12,330,771 B2
(45) Date of Patent: Jun. 17, 2025

(54) DIFFERENTIAL LOCK ACTUATOR SYSTEMS AND METHODS FOR MOVING FLIGHT CONTROL SURFACE

(71) Applicant: HONEYWELL INTERNATIONAL INC., Charlotte, NC (US)

(72) Inventors: Antonin Skarolek, Brno (CZ); Tomas Ripel, Brno (CZ); Michal Nozka, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/923,114

(22) Filed: Oct. 22, 2024

(65) Prior Publication Data

US 2025/0136270 A1    May 1, 2025

Related U.S. Application Data

(60) Provisional application No. 63/594,572, filed on Oct. 31, 2023.

(51) Int. Cl.
*F16H 63/34* (2006.01)
*B64C 13/34* (2006.01)
(Continued)

(52) U.S. Cl.
CPC ............. *B64C 13/34* (2013.01); *F16H 57/10* (2013.01); *F16H 63/34* (2013.01); *F16H 1/2854* (2013.01);
(Continued)

(58) Field of Classification Search
CPC ......... B64C 13/34; F16H 57/10; F16H 63/34; F16H 1/2854; F16H 3/46; F16H 48/10; F16H 2048/104
See application file for complete search history.

(56) References Cited

U.S. PATENT DOCUMENTS 3,593,092 A    7/1971   Flippo
3,958,779 A *  5/1976   Townsend ............... B64C 13/42
                                                  74/471 R
(Continued)

FOREIGN PATENT DOCUMENTS

AU    2013201056 A1    11/2013
EP       2727831 A     5/2014
(Continued)

OTHER PUBLICATIONS

XP020091982; Fawaz Yahya Annaz; "Fundamental design concepts in multi-lane smart electromechanical actuators; Fundamental design concepts in multi-lane smart electromechanical actuators"; Smart Materials and Structures; IOP Publishing Ltd.; Bristol, GB; vol. 14, No. 6; Dec. 1, 2005; pp. 1227-1238; ISSN: 0964-1726; DOI: 10.1088/0964-1726/14/6/016.
(Continued)

*Primary Examiner* — Justin Holmes
(74) *Attorney, Agent, or Firm* — Lorenz & Kopf, LLP

(57) ABSTRACT

A differential actuator system for controlling a flight control surface is provided, which includes a first control lane subsystem, a second control lane subsystem, a differential subsystem and a differential lock subsystem. The differential subsystem includes a first gear set forming a first load path from the first control lane to the flight control surface, and a second gear set forming a second load path from the second control lane to the flight control surface. The differential lock subsystem operably couples to the first gear set and the second gear set and is switchable between a locked state to couple the first and second gear sets in a torque-summing mode for moving the flight control surface and an unlocked state to couple the first and second gear sets in a velocity-summing mode for moving the flight control sur-
(Continued)

face. Control signals issued from a controller operate the differential actuator system.

19 Claims, 9 Drawing Sheets

(51) Int. Cl.
*F16H 57/10* (2006.01)
*F16H 1/28* (2006.01)
*F16H 3/46* (2006.01)
*F16H 48/10* (2012.01)

(52) U.S. Cl.
CPC ............... *F16H 3/46* (2013.01); *F16H 48/10* (2013.01); *F16H 2048/104* (2013.01)

(56) References Cited

U.S. PATENT DOCUMENTS

| | | | |
|---|---|---|---|
| 4,555,978 A | 12/1985 | Burandt et al. | |
| 5,144,851 A | 9/1992 | Grimm et al. | |
| 5,214,972 A * | 6/1993 | Larson | B64C 13/505 |
| | | | 74/89.26 |
| 6,791,215 B2 | 9/2004 | Tesar | |
| 7,122,926 B2 | 10/2006 | Tesar | |
| 8,230,750 B2 * | 7/2012 | Flatt | B64C 13/341 |
| | | | 244/99.2 |
| 8,336,818 B2 | 12/2012 | Flatt | |
| 8,814,085 B2 | 8/2014 | Richter et al. | |
| 9,086,125 B2 * | 7/2015 | Kopp | F16H 21/44 |
| 9,193,439 B2 | 11/2015 | Hagerott et al. | |
| 9,193,455 B2 | 11/2015 | Cotton et al. | |
| 9,663,221 B2 | 5/2017 | Ishihara | |
| 10,669,014 B2 | 6/2020 | Wang et al. | |
| 10,696,380 B2 | 6/2020 | Miller et al. | |
| 11,085,513 B2 | 8/2021 | Seminel et al. | |
| 11,235,862 B2 | 2/2022 | Miyazono et al. | |
| 2011/0082634 A1 | 4/2011 | Povirk et al. | |
| 2022/0227484 A1 | 7/2022 | Brewer et al. | |

FOREIGN PATENT DOCUMENTS

EP 3587860 A1 1/2020
WO 1988002720 A1 4/1988

OTHER PUBLICATIONS

Moog, Electric Actuation for Flight & Engine Control: Evolution & Challenges, Feb. 28, 2007.
Felix Larsson, Evaluation of Aircraft Actuator Technologies, 2023.

* cited by examiner

DIFFERENTIAL LOCK ACTUATOR SYSTEMS AND METHODS FOR MOVING FLIGHT CONTROL SURFACE

CROSS-REFERENCE TO RELATED APPLICATIONS

This application claims the benefit of U.S. Provisional Application No. 63/594,572, filed on Oct. 31, 2023, titled Differential Lock Actuator Systems And Methods For Moving Flight Control Surface. The entire disclosure of the above application is incorporated herein by reference.

TECHNICAL FIELD

The present disclosure generally relates to vehicles, such as aerial vehicles, and more particularly relates to an actuator system with a differential lock system and associated methods for moving a flight control surface of an aerial vehicle.

BACKGROUND

Actuators are integral components in various mechanical and electromechanical systems, converting electrical energy into mechanical energy. They are widely utilized in aerospace systems, robotics, automotive systems, industrial machinery, and more. For example, hinge line actuators are used for various aerospace applications, including primary flight controls. In these applications, redundant actuators are often needed to comply with hazards' safety objectives.

Velocity-summing actuators function by combining multiple mechanical inputs organized independently in a way that generates a single output function without their mutual force fight and consequently allows operation of the actuator even in situations where a mechanical jam occurs on one of these inputs. The inputs are typically represented by motors that may be geared properly to gain specific kinematic and dynamic properties. A major drawback of such a concept is unconstrained motion in case of mechanical disconnect within the drive train.

Conversely, torque-summing actuators function by direct summing the torques from multiple input sources to produce an output torque. In the opposite to velocity summing mechanisms, a jam in one of the inputs results in jam of the output however mechanical disconnect only reduce the output torque leaving the output in degraded yet functional state. This operational principle is commonly employed in systems requiring high torque outputs, such as heavy machinery and certain types of robotic arms. The torque-summation is achieved through mechanical linkages or gear systems that combine the torque from each input source. The primary advantage of this approach is that malfunction of one input source does not result in unconstrained motion of the actuator's output. Torque summing actuators may, however, be prone to an output jam, should one of the input sources jam because of a malfunction.

SUMMARY

In general, the present disclosure provides a more advanced configuration of dual control lane actuator systems by implementing a differential lock for further mitigating unconstrained output motion (free-float control surface in flight controls application). In one embodiment, the present disclosure provides a differential actuator system for controlling a flight control surface. The system includes a first control lane subsystem including a first motor for rotating a first drive shaft, a second control lane subsystem including a second motor for rotating a second drive shaft, and a differential subsystem. The differential subsystem includes a first gear set having a first input gear driven by the first drive shaft, a first output gear configured to control the flight control surface, and a first gear train operably coupling the first input gear to the first output gear. The first gear set forms a first load path from the first control lane to the flight control surface. The differential subsystem also includes a second gear set having a second input gear driven by the second drive shaft, a second output gear configured to control the flight control surface, and a second gear train operably coupling the second input gear to the second output gear. The second gear set forms a second load path, separate from the first load path, from the second control lane to the flight control surface. The differential subsystem also includes a differential lock subsystem operably coupled to the first gear set and the second gear set. The differential lock subsystem is switchable between a locked state to couple the first and second gearsets in a torque-summing mode for moving the flight control surface and an unlocked state to couple the first and second gear sets in a velocity-summing mode for moving the flight control surface. A controller is configured to send control signals to the first and second control lane subsystems and the differential lock subassembly for selectively operating the differential actuator system.

In another form, the present disclosure provides a differential actuator system for controlling a flight control surface. The system includes a first control lane subsystem including a first motor for rotating a first drive shaft and a first brake operably coupled to the first motor and configured to control rotation of the first drive shaft, a second control lane subsystem including a second motor for rotating a second drive shaft and a second brake operably coupled to the second motor and configured to control rotation of the second drive shaft, a differential system, a differential lock subsystem and a controller. The differential subsystem includes a compound gear assembly including a first compound planetary gear set having a first sun gear driven by the first drive shaft, a first ring gear configured to control the flight control surface, and a first gear train operably coupling the first sun gear to the first ring gear. The first compound planetary gear set forms a first load path from the first control lane to the flight control surface. The compound gear assembly includes a second compound planetary gear set having a second sun gear driven by the second drive shaft, a second ring gear configured to control the flight control surface, and a second gear train operably coupling the second sun gear to the second ring gear. The second compound planetary gear set forms a second load path, separate from the first load path, from the second control lane to the flight control surface. The differential lock subsystem is operably coupled to the first compound planetary gear set and the second compound planetary gear set. The differential lock subsystem includes a third brake operably coupled to a gear coupling operably disposed between the first gear train and the second gear train. The controller is configured to send control signals to the first and second control lane subsystems and the differential lock subassembly for operating the differential actuator system. The controller is configured to send a first set of control signals for engaging the third brake and disengaging the first and second brakes for operating the differential actuator system in a torque-summing mode and to send a second set of control signals for disengaging the first, second and third brakes for operating the differential actuator system in the velocity-summing mode.

The aspects defined above as well as additional aspects, features and advantages of the present disclosure can also be derived from the examples of the embodiments described hereinafter with reference to the embodiments shown in the figures.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
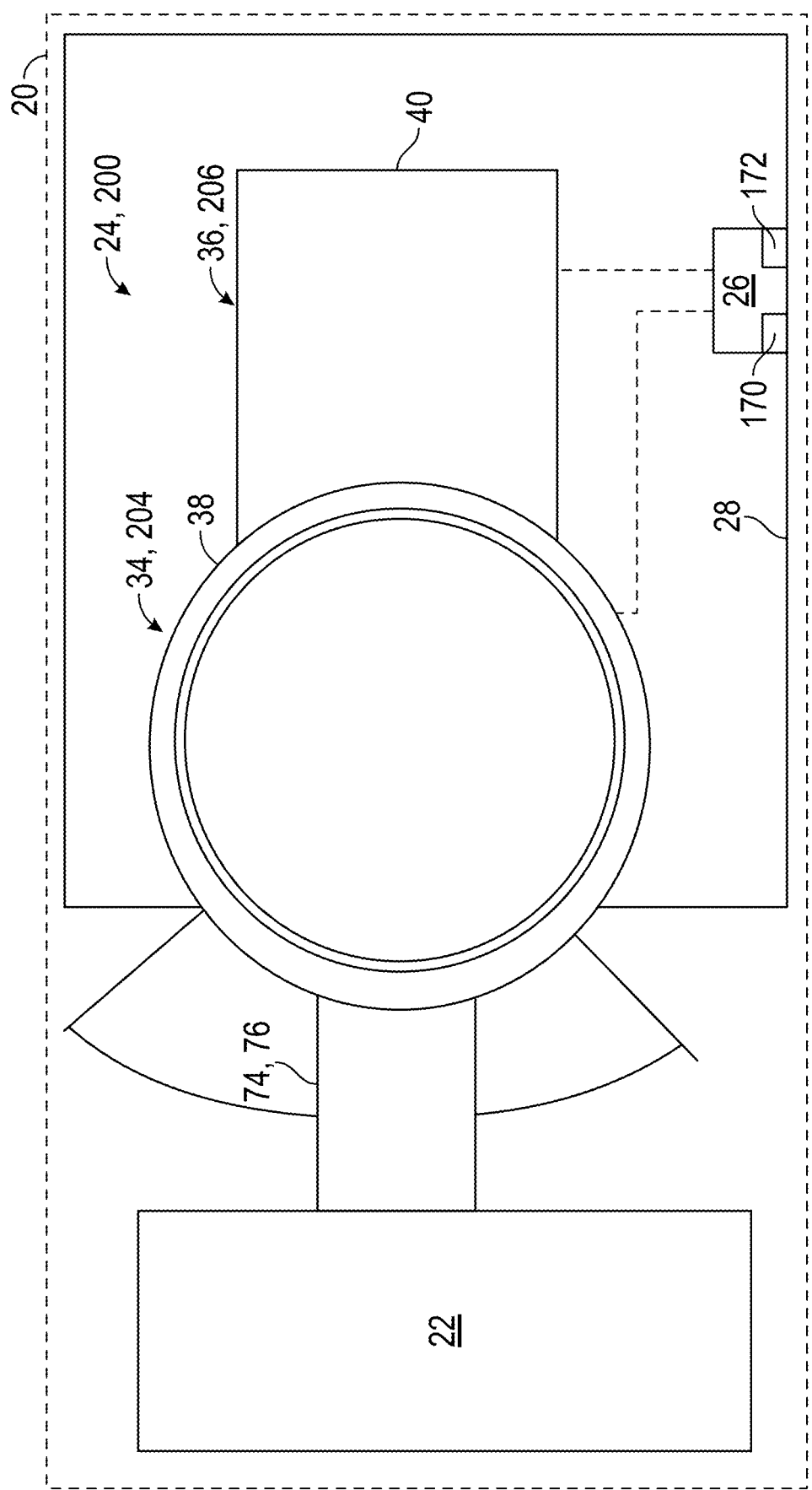
FIG. 1 is a functional block diagram of a vehicle, such as an aerial vehicle, which includes an actuator system with a differential lock system for moving a flight control surface associated with the aerial vehicle in accordance with the various teachings of the present disclosure.

The following detailed description is merely exemplary in nature and is not intended to limit the application and uses. Furthermore, there is no intention to be bound by any expressed or implied theory presented in the preceding technical field or the following detailed description. In addition, those skilled in the art will appreciate that the embodiments of the present disclosure may be practiced in conjunction with any type of arrangement that would benefit from an actuator system with a differential lock system. Furthermore, the use of the actuator system with a differential lock system for moving a flight control surface associated with an aerial vehicle as described herein provides merely one exemplary utilization according to the present disclosure. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes a degree of precision or exactitude based on the operability of a component, subsystem or system, whereas the term "substantially" denotes a degree of precision or exactitude based on the permissible variation of a component, subsystem or system in some characteristic such as dimension, weight, hardness, etc.

With reference to FIG. 1, a schematic end view of a portion of a vehicle, such as an aerial vehicle 20, is shown. In this example, the aerial vehicle 20 is a fixed-wing aircraft. The aerial vehicle 20 includes a primary flight control surface 22, an actuator system 24 and a controller 26. The actuator system 24 is coupled to the primary flight control surface 22 to move or rotate the primary flight control surface 22 based on one or more control signals received from the controller 26. In one example, the primary flight control surface 22 is an aileron, however, the actuator system 24 may be used to move or rotate a rudder, elevator, etc. In addition, the actuator system 24 may be used in conjunction with another actuator system to move or rotate a flap. Moreover, while a single actuator system 24 is shown herein for use with the primary flight control surface 22, any number of actuator systems 24 may be employed depending on the length of the primary flight control surface 22, for example.

The flight control surface 22 is generally supported on a frame 28 associated with the aerial vehicle 20 for rotation by the actuator system 24. The actuator system 24 may be coupled to the frame 28 so as to be fixed or stationary relative to the frame 28. The actuator system 24 may be configured to move a flight control surface 22 through any desired range of motion that is typical for the particular flight control surface. In one example, the frame 28 is a wing beam. It should be noted that the position and shape of the frame 28 associated with the aerial vehicle 20 illustrated in FIG. 1 is merely exemplary, as the actuator system 24 and/or the flight control surface 22 may be coupled to the aerial vehicle 20 via any suitable structure.

Figure 2:
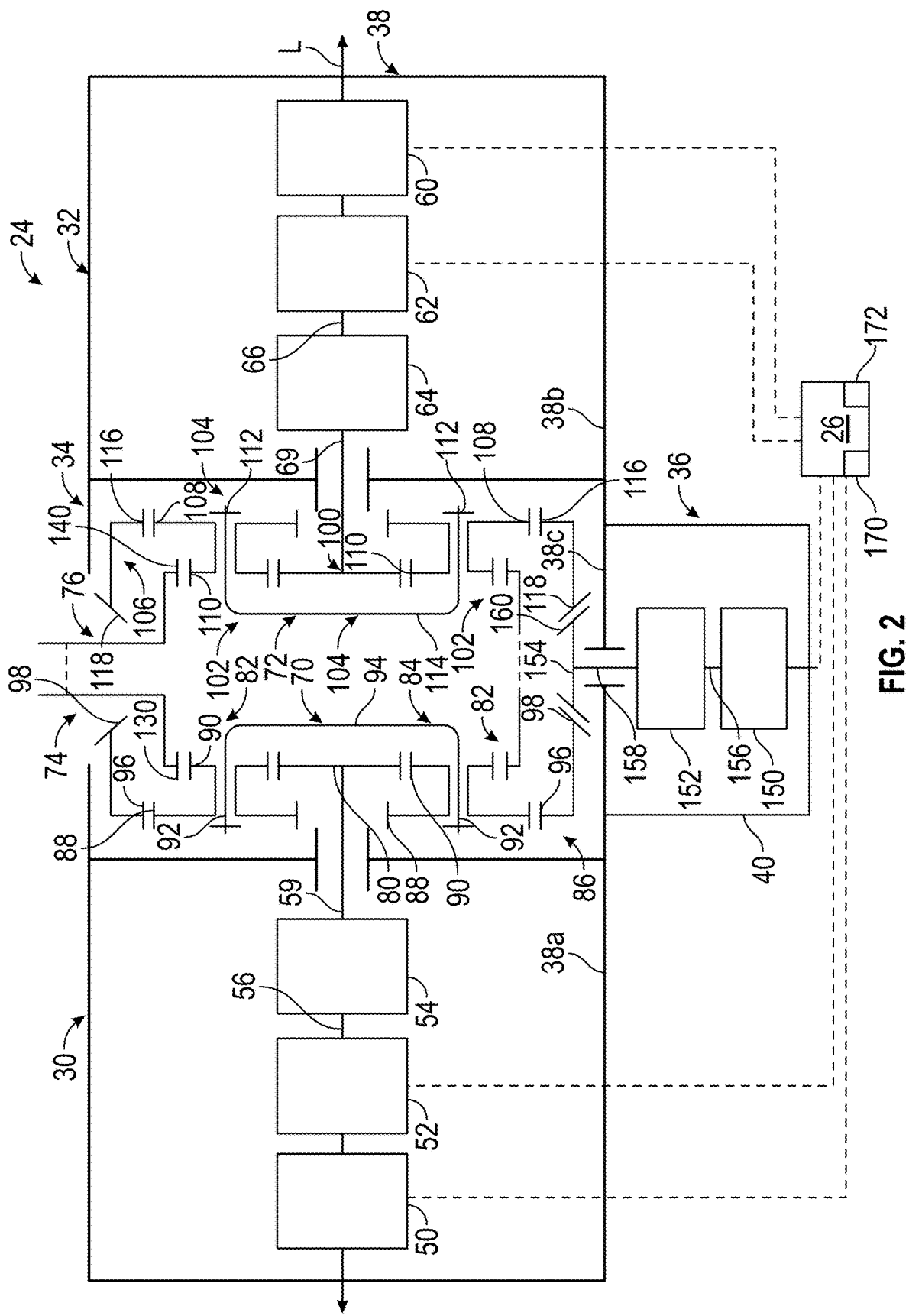
FIG. 2 is a schematic illustration of the exemplary actuator system and differential lock system for use with the aerial vehicle of FIG. 1.

With reference to FIG. 2, the actuator system 24 is shown in greater detail. In one example, the actuator system 24 includes a first control lane 30, a second control lane 32, a differential subsystem 34, and a differential lock subsystem 36. In one form, the first control lane 30, the second control lane, and the differential lock subsystem 36 are in communication with and coupled to the controller 26. The first control lane 30, the second control lane 32, and the differential subsystem 34 may be contained within an actuator housing 38. The differential lock subsystem 36 may be contained within a second actuator housing 40, which is in communication with the actuator housing 38 via an opening, for example, to enable the differential lock subsystem 36 to be coupled to the differential subsystem 34. In other embodiments, the actuator housing 38 and the second actuator housing 40 may comprise a single housing which substantially encloses the first control lane 30, the second control lane 32, the differential subsystem 34 and the differential lock subsystem 36. In this example, the first control lane 30 is positioned within a first section 38a of the actuator housing 38, the second control lane 32 is positioned within a second section 38b of the actuator housing 38, and the differential subsystem 34 is positioned within a third, center section 38c of the actuator housing 38, with the first section 38a and the second section 38b on opposed sides of the center section 38c. Each of the first section 38a and the second section 38b are in communication with the center section 38c, via openings, for example, to enable the first control lane 30 and the second control lane 32 to be coupled to the differential subsystem 34. The center section 38c also defines an opening or the like to enable a respective portion of the differential subsystem 34 to be coupled to the primary flight control surface 22. The first control lane 30 may be positioned opposite the second control lane 32 along a longitudinal axis L of the actuator system 24 and indirectly coupled to the primary flight control surface 22 via the differential subsystem 34.

In one example, the first control lane 30 includes a first brake 50, a first motor 52, and a first speed reducer or reductor 54. The first brake 50 is a failsafe brake, and in one example, is a rotating shaft failsafe brake. The first brake 50 is coupled to the first motor 52, and is in communication with the controller 26. In one example, the first brake 50 is coupled to a first rotor 56 of the first motor 52, and is responsive to one or more control signals from the controller 26 to inhibit a rotation of the first rotor 56. The first brake 50 is in communication with the controller 26, via a communication architecture that facilitates the transfer of data, power and commands, such as a bus. Thus, in this example, the first brake 50 is electrically actuated, but in other embodiments, the first brake 50 may be hydraulically actuated, etc. In one example, the first brake 50 prevents or locks shaft rotation of the first motor 52 when engaged, such as the controller 26 removes power from the first brake 50 or no power is supplied to the first brake 50. On the other hand, the first brake 50 is disengaged and is unlocked to allow shaft rotation of the first motor 52 when the controller 26 provides power to the first brake 50. The controller 26 shall be further discussed below.

The first motor 52 is coupled to the first speed reductor 54 to drive the first speed reductor 54. It should be noted that in certain instances, the first motor 52 may directly drive the differential subsystem 34, if desired. In one example, the first motor 52 may comprise any suitable electric servomotor, including, but not limited to a brushless direct current (BLDC) motor, permanent magnet synchronous motor, variable or switched reluctance motor, stepper motor, etc. The first motor 52 may be cylindrical, and is sized to be received within the first section 38a of the actuator housing 38. In this example, the first motor 52 includes the first rotor 56, which is surrounded by a first stator (not shown). In one example, the first rotor 56 includes one or more magnets or conductors (not shown), which create a magnetic field. The first stator 58 surrounds the first rotor 56 and includes two or more conductors that create a magnetic field to rotate the first rotor 56. It should be noted that other configurations of the first rotor 56 and the first stator 58 are possible, for example, in the example of the first motor 52 as a variable or switched reluctance motor. The first rotor 56 is coupled to the first speed reductor 54 such that the rotation of the first rotor 56 drives the first speed reductor 54.

In one example, the first speed reductor 54 is a gear set, and in this example, the first speed reductor 54 comprises a planetary gear set having a concentric input provided by the first rotor 56 and first reductor output shaft 59. The first speed reductor 54 may reduce a speed of the first rotor 56 by about 1 to about 0.001 and increase a torque of the first rotor 56 by about 1 to about 1000. The first speed reductor 54 is coupled to the differential subsystem 34 to drive a portion of the differential subsystem 34.

It should be noted that the first control lane 30 need not include the first brake 50. In this regard, in the example of the first speed reductor 54 as a self-locking, non-back drivable speed reductor, the first control lane 30 may be devoid of the first brake 50. In this example, the first speed reductor 54 is in communication with the controller 26 over a communication architecture that facilitates the transfer of data, power and commands, such as a bus, and the first speed reductor 54 is responsive to one or more control signals from the controller 26 to lock and inhibit the rotation of the first rotor 56.

The second control lane 32 includes a second brake 60, a second motor 62, and a second speed reducer or reductor 64. The second brake 60 is a failsafe brake, and in one example, is a rotating shaft failsafe brake. The second brake 60 is coupled to the second motor 62, and is in communication with the controller 26. In one example, the second brake 60 is coupled to a second rotor 66 of the second motor 62, and is responsive to one or more control signals from the controller 26 to inhibit a rotation of the second rotor 66. The second brake 60 is in communication with the controller 26, via a communication architecture that facilitates the transfer of data, power and commands, such as a bus. Thus, in this example, the second brake 60 is electrically actuated, but in other embodiments, the second brake 60 may be hydraulically actuated, etc. In one example, the second brake 60 operates by engaging to prevent or lock shaft rotation of the second motor 66 when the controller 26 removes power from the second brake 60. On the other hand, the second brake 60 disengages to allow or unlock shaft rotation of the second motor 66 when the controller 26 provides power to the second brake 60. The controller 26 will be further discussed below.

The second motor 62 is coupled to the second speed reductor 64 and to the second brake 60. It should be noted that in certain instances, the second motor 62 may directly drive the differential subsystem 34, if desired. In one example, the second motor 62 may comprise any suitable electric servomotor, including, but not limited to a brushless direct current (BLDC) motor, permanent magnet synchronous motor, variable or switched reluctance motor, stepper motor, etc. Generally, the first motor 52 and the second motor 62 are the same, however, in other embodiments, the first motor 52 may be different than the second motor 62. The second motor 62 may be cylindrical, and is sized to be received within the second section 38b of the actuator housing 38. In this example, the second motor 62 includes the second rotor 66, which is surrounded by a second stator (not shown). In one example, the second rotor includes one or more magnets or conductors (not shown), which create a magnetic field. The second stator surrounds the second rotor 66 and includes two or more conductors that create a magnetic field to rotate the second rotor 66. It should be noted that other configurations of the second rotor 66 and the second stator are possible, for example, in the example of the second motor 62 as a variable or switched reluctance motor. The second rotor 66 is coupled to the second speed reductor 64 such that the rotation of the second rotor 66 drives the second speed reductor 64.

Generally, each of the first speed reductor 54 and the second speed reductor 64 are the same, but the first speed reductor 54 or the second speed reductor 64 may be different to compensate for differences between the first motor 52 and the second motor 62, for example. In one example, the second speed reductor 64 is a gear set, and in this example, the second speed reductor 64 comprises a planetary gear set having a concentric input provided by the second rotor 66 and second reductor output shaft 69. The second speed reductor 64 may reduce a speed of the second rotor 66 by about 1 to about 0.001 and increase a torque of the second rotor 66 by about 1 to about 1000. The second speed reductor 64 is coupled to the differential subsystem 34 to drive a portion of the differential subsystem 34.

It should be noted that the second control lane 32 also need not include the second brake 60. In this regard, in the example of the second speed reductor 64 as a self-locking, non-back drivable speed reductor, the second control lane 32 may be devoid of the second brake 60. In this example, the second speed reductor 64 is in communication with the controller 26 over a communication architecture that facilitates the transfer of data, power and commands, such as a bus, and the second speed reductor 64 is responsive to one or more control signals from the controller 26 to lock and inhibit the rotation of the second rotor 66.

The differential subsystem 34 is coupled to the first speed reductor 54 and the second speed reductor 64. The differential subsystem 34 is also coupled to the differential lock subsystem 36 and the primary flight control surface 22. In one example, the differential subsystem 34 includes a compound gear assembly having a first compound planetary gear set 70, a second compound planetary gear set 72, a first output arm 74 and a second output arm 76. The first compound planetary gear set 70 is coupled to the first control lane 30, and the second compound planetary gear set 72 is coupled to the second control lane 32.

In some forms, the first compound planetary gear set 70 is a drive gear set that moves flight control. For example, the first compound planetary gear set 70 includes a first sun gear 80, at least one first planet gear 82, a first planet carrier plate 84 and a first ring gear 86. The first sun gear 80 is coupled to the first reductor output shaft 59 of the first control lane 30 and is driven by the first reductor output shaft 59. In one example, the first sun gear 80 includes a plurality of straight or spur gear teeth about a perimeter or circumference of the first sun gear 80. The gear teeth of the first sun gear 80 are coupled to or meshingly engaged with a plurality of straight or spur gear teeth associated with the at least one first planet gear 82 such that the first sun gear 80 drives the at least one first planet gear 82.

In one example, the at least one first planet gear 82 comprises two or more first planet gears 82. For example, the first compound planetary gear set 70 may include four first planet gears 82. In this example, each of the first planet gears 82 comprises a stepped planet gear, and includes a first step 88 and a second step 90. Each of the first step 88 and the second step 90 include a plurality of straight or spur gear teeth, which extend about a perimeter or circumference of the first planet gear 82 at the respective one of the first step 88 and the second step 90. The gear teeth of the first step 88 are coupled to or meshingly engaged with a plurality of straight or spur gear teeth associated with the first ring gear 86 to drive the first ring gear 86. The gear teeth of the second step 90 are coupled to or meshingly engaged with a plurality of straight or spur gear teeth associated with the first output arm 74 to drive the first output arm 74. The gear teeth of the second step 90 are also coupled to or meshingly engaged with the gear teeth of the first sun gear 80 to be driven by the first sun gear 80.

The first planet carrier plate 84 supports each of the first planet gears 82 for rotation. In one example, the first planet carrier plate 84 may include a plurality of posts 92. Each of the posts 92 extends through a center bore of a respective one of the first planet gears 82. The posts 92 may be connected to or integrally formed with a body 94 of the first planet carrier plate 84.

The first ring gear 86 surrounds at least the first step 88 of the first planet gears 82. In one example, the first ring gear 86 includes the plurality of straight or spur gear teeth 96 defined about an inner perimeter or inner circumference of the first ring gear 86, and a plurality of bevel gear teeth 98 defined about an outer perimeter or circumference of the first ring gear 86. The spur gear teeth of the first ring gear 86 are coupled to or meshingly engaged with the spur gear teeth associated with the first step 88 of each of the first planet gears 82 such that the first planet gears 82 drive the first ring gear 86. The bevel gear teeth 98 of the first ring gear 86 are coupled to or meshingly engaged with a plurality of bevel gear teeth associated with the differential lock subsystem 36. It should be noted that in certain examples, the first ring gear 86 may comprise a crown gear, with the bevel gear teeth 98 defined to extend outwardly from a plane that includes the spur gear teeth 96. Regardless of the type of gear used, one skilled in the art will understand that the examples described herein provide a gear coupling between the first ring gear 86 and the differential lock subsystem 36.

In one example, the second compound planetary gear set 72 includes a second sun gear 100, at least one second planet gear 102, a second planet carrier plate 104 and a second ring gear 106. The second sun gear 100 is coupled to the second reductor output shaft 69 of the second control lane 32 and is driven by the second reductor output shaft 69. In one example, the second sun gear 100 includes a plurality of straight or spur gear teeth about a perimeter or circumference of the second sun gear 100. The gear teeth of the second sun gear 100 are coupled to or meshingly engaged with a plurality of straight or spur gear teeth associated with the at least one second planet gear 102 such that the second sun gear 100 drives the at least one second planet gear 102.

In one example, the at least one second planet gear 102 comprises two or more second planet gears 102. For example, the second compound planetary gear set 72 may include four second planet gears 102. In this example, each of the second planet gears 102 comprises a stepped planetary gear, and includes a first step 108 and a second step 110. Each of the first step 108 and the second step 110 include a plurality of straight or spur gear teeth, which extend about a perimeter or circumference of the respective second planet gear 102 at the respective one of the first step 108 and the second step 110. The gear teeth of the first step 108 are coupled to or meshingly engaged with a plurality of straight or spur gear teeth associated with the second ring gear 106 to drive the second ring gear 106. The gear teeth of the second step 110 are coupled to or meshingly engaged with a plurality of straight or spur gear teeth associated with the second output arm 76 to drive the second output arm 76. The gear teeth of the second step 110 are also coupled to or meshingly engaged with the gear teeth of the second sun gear 100 to be driven by the second sun gear 100.

The second planet carrier plate 104 supports each of the second planet gears 102 for rotation. In one example, the second planet carrier plate 104 may include a plurality of second posts 112. Each of the second posts 112 extends through a center bore of a respective one of the second planet gears 102. The second posts 112 may be connected to or integrally formed with a second body 114 of the second planet carrier plate 104.

The second ring gear 106 surrounds at least the first step 108 of the second planet gears 102. In one example, the second ring gear 106 includes the plurality of straight or spur gear teeth 116 defined about an inner perimeter or inner circumference of the second ring gear 106, and a plurality of bevel gear teeth 118 defined about an outer perimeter or circumference of the second ring gear 106. The spur gear teeth 116 of the second ring gear 106 are coupled to or meshingly engaged with the spur gear teeth associated with the first step 108 of each of the second planet gears 102 such that the second planet gears 102 drive the second ring gear 106. The bevel gear teeth 118 of the second ring gear 106 are coupled to or meshingly engaged with a plurality of bevel gear teeth associated with the differential lock subsystem 36. It should be noted that in certain examples, the second ring gear 106 may comprise a crown gear, with the bevel gear teeth 118 defined to extend outwardly from a plane that includes the spur gear teeth 116. Regardless of the type of gear used, one skilled in the art will understand that the examples described herein provide a gear coupling between the second ring gear 106 and the differential lock subsystem 36.

The first output arm 74 is coupled to the first compound planetary gear set 70 to be driven by the first compound planetary gear set 70, and the second output arm 76 is coupled to the second compound planetary gear set 72 to be driven by the second compound planetary gear set 72, which provides two separate load paths to the primary flight control surface 22. In one example, the first output arm 74 includes a first end that defines a plurality of straight or spur gear teeth 130. The spur gear teeth 130 of the first output arm 74 are coupled to or meshingly engaged with the spur gear teeth of the second step 90 of each of the first planet gears 82. A second end of the first output arm 74 is coupled to the primary flight control surface 22 to move the primary flight control surface 22.

The second output arm 76 includes a first end that defines a plurality of straight or spur gear teeth 140. The spur gear teeth 140 of the second output arm 76 are coupled to or meshingly engaged with the spur gear teeth of the second step 110 of each of the second planet gears 102. A second end of the second output arm 76 is coupled to the primary flight control surface 22 to move the primary flight control surface 22. Generally, each of the output arms 74, 76 may be coupled directly to the primary flight control surface 22 via at least one bolted joint between the respective output arm 74, 76 and internal structure of the primary flight control surface 22, such as an internal rib of the primary flight control surface 22. Alternatively, the output arms 74, 76 may be attached to a system that controls a movement of the primary flight control surface 22 to change the kinematics from simple rotation to more complex movement.

In general, the first output arm 74 is coupled to the second output arm 76 at the primary flight control surface 22 to ensure that the first output arm 74 and the second output arm 76 move the primary flight control surface 22 in unison. Optionally, the first output arm 74 is coupled to the second output arm 76 directly to ensure that the first output arm 74 and the second output arm 76 move in unison without straining the primary flight control surface 22. The absence of additional torsional strain to the primary flight control surface 22 is beneficial, and may be more favorable than connecting the output arms 74, 76 together via the primary flight control surface 22.

The differential lock subsystem 36 is enclosed in the second actuator housing 40. The differential lock subsystem 36 is coupled to the first ring gear 86 and the second ring gear 106, and is in communication with the controller 26 (FIG. 1). The differential lock subsystem 36 is in communication with the controller 26 over a communication architecture that enables the transfer of data, power and commands, including, but not limited to, a bus. In one example, the differential lock subsystem 36 includes a third brake 150, a third speed reducer or reductor 152 and a gear coupling in the form of a bevel gear 154.

The third brake 150 is a failsafe brake, and in one example, is a rotating shaft failsafe brake. The third brake 150 is coupled to the third speed reductor 152, and is in communication with the controller 26. In one example, the third brake 150 is coupled to an input shaft 156 of the third speed reducer 152, and is responsive to one or more control signals from the controller 26 to inhibit a rotation of the input shaft 156, and thus, the bevel gear 154. The third brake 150 is in communication with the controller 26, via a communication architecture that facilitates the transfer of data, power and commands, such as a bus. Thus, in this example, the third brake 150 is electrically actuated, but in other embodiments, the third brake 150 may be actuated by other means (e.g., mechanically or hydraulically). In one example, the third brake 150 prevents or lock shaft rotation of the third speed reducer 152, when engaged, such as the controller 26 removes power from the third brake 152 or no power is supplied to the third brake 152. On the other hand, the third brake 152 is disengaged and is unlocked to allow the shaft rotation of the third speed reducer 52 when the controller 26 provides power to the third brake 152. The controller 26 shall be further discussed below.

In one example, the third speed reducer 152 is a gear set, and in this example, the third speed reducer 152 comprises a planetary gear set having the input shaft 156 and an output shaft 158, which is concentric with the input shaft 156. The third speed reducer 152 may increase a speed of the output shaft 158 by about 1 to about 1000 and decrease a torque of the output shaft 158 by about 1 to about 0.001. The input shaft 156 of the third speed reducer 152 is coupled to the third brake 150 to enable the third brake 150 to apply a brake torque to inhibit a rotation of the input shaft 156, and thus, the output shaft 158. The output shaft 158 is coupled to the bevel gear 154. It should be noted that in certain instances the third brake 150 may be designed to match the load capacity of the torque of the output shaft 158, and the third speed reducer 152 may not be present. In this instance, the third brake 150 may be coupled directly to or connected directly with the output shaft 158.

The bevel gear 154 is coupled to the output shaft 158 so as to form a gear coupling that rotates with the output shaft 158 and is driven by the first ring gear 86 and the second ring gear 106. In general, the first ring gear 86 and the second ring gear 106 rotate in opposite directions at about the same velocity due to the coupling of the bevel gear 154 between the first ring gear 86 and the second ring gear 106. In one example, the bevel gear 154 includes a plurality of bevel gear teeth 160 about a perimeter or circumference of the bevel gear 154. The bevel gear teeth 160 of the bevel gear 154 are coupled to or meshingly engaged with the bevel gear teeth 98 of the first ring gear 86 and the bevel gear teeth 118 of the second ring gear 106 such that the first ring gear 86 and the second ring gear 106 drive the bevel gear 154. It should be noted that while a single bevel gear 154 is described and illustrated herein, the gear coupling may take other forms such as a pair of bevel gears, one or more crown gears, etc.

As will be discussed, the third brake 150 is responsive to one or more control signals from the controller 26 to engage and move the differential lock subsystem 36 to a first, locked state in which the rotation of the output shaft 158, and thus, the bevel gear 154 is inhibited from rotating. When the rotation of the bevel gear 154 is inhibited, the first ring gear 86 and the second ring gear 106 are also inhibited from rotation and held fixed relative to the center section 86c of the actuator housing 38. With the first ring gear 86 and the second ring gear 106 inhibited from rotating, the actuator system 24 is a torque-summing speed reducer in the first, locked state of the differential lock subsystem 36. Conversely, when the third brake 150 is not engaged and the differential lock subsystem 36 is in a second, unlocked state, the bevel gear 154 is free to rotate with the first ring gear 86 and the second ring gear 106. As the first ring gear 86 and the second ring gear 106 rotate in the opposite directions at about the same velocity, the actuator system 24 is a velocity-summing speed reducer in the second, unlocked state of the differential lock subsystem 36.

It should be noted that while the actuator system 24 is described herein as including the differential lock subsystem 36 having a gear coupling in the form of the bevel gear 154 to inhibit a rotation of the first ring gear 86 and the second ring gear 106, the actuator system 24 may be configured differently to inhibit the rotation of the first ring gear 86 and the second ring gear 106. In one example, with reference to FIG. 3, an actuator system 200 is shown, which may be coupled to the aerial vehicle 20 to move the primary flight control surface 22. As the actuator system 200 includes components that are the same or similar to components of the actuator system 24 discussed with regard to FIGS. 1-2, the same reference numerals will be used to denote the same or similar components. In one example, the actuator system 200 includes the first control lane 30, the second control lane 32, a differential subsystem 204 and a differential lock subsystem 206. The first control lane 30, the second control lane 32, and the differential subsystem 204 may be contained within an actuator housing 238. The differential lock subsystem 206 may be contained within a second actuator housing 240, which is in communication with the actuator housing 238 via an opening, for example, to enable the differential lock subsystem 206 to move the differential subsystem 204 from an unlocked state to a locked state. In other embodiments, the actuator housing 238 and the second actuator housing 240 may comprise a single housing which substantially encloses the first control lane 30, the second control lane 32, the differential subsystem 204 and the differential lock subsystem 206. In this example, the first control lane 30 is positioned within a first section 238a of the actuator housing 238, the second control lane 32 is positioned within a second section 238b of the actuator housing 238, and the differential subsystem 204 is positioned within a third, center section 238c of the actuator housing 238, with the first section 238a and the second section 238b on opposed sides of the center section 238c. Each of the first section 238a and the second section 238b are in communication with the center section 238c, via openings, for example, to enable the first control lane 30 and the second control lane 32 to be coupled to the differential subsystem 204. The center section 238c also defines an opening or the like to enable a respective portion of the differential subsystem 204 to be coupled to the primary flight control surface 22. The first control lane 30 may be positioned opposite the second control lane 32 along a longitudinal axis L of the actuator system 200, and indirectly coupled to the primary flight control surface 22 via the differential subsystem 204.

The first control lane 30 includes the first brake 50, the first motor 52 and the first speed reducer 54. The first speed reducer 54 is coupled to the differential subsystem 204 to drive a portion of the differential subsystem 204. The second control lane 32 includes the second brake 60, the second motor 62, and the second speed reducer 64. The second speed reducer 64 is coupled to the differential subsystem 204 to drive a portion of the differential subsystem 204. The first motor 52 and/or the second motor 62 may also directly drive the differential subsystem 204.

The differential subsystem 204 is coupled to the first speed reducer 54 and the second speed reducer 64. The differential subsystem 204 is also coupled to the differential lock subsystem 206 and the primary flight control surface 22. In one example, the differential subsystem 204 includes a first compound planetary gear set 270, a second compound planetary gear set 272, the first output arm 74 and the second output arm 76. The first compound planetary gear set 270 is coupled to the first control lane 30, and the second compound planetary gear set 272 is coupled to the second control lane 32. In one example, the first compound planetary gear set 270 includes the first sun gear 80, the first planet gears 82, the first planet carrier plate 84 and a first ring gear 286.

The first sun gear 80 is coupled to the first reductor output shaft 59 of the first control lane 30 and is driven by the first reductor output shaft 59. The first sun gear 80 is coupled to first planet gears 82 such that the first sun gear 80 drives first planet gears 82. The gear teeth of the first step 88 of each of the first planet gears 82 are coupled to or meshingly engaged with the first ring gear 86 to drive the first ring gear 86. The gear teeth of the second step 90 of each of the first planet gears 82 are coupled to or meshingly engaged with the first output arm 74 to drive the first output arm 74. The gear teeth of the second step 90 are also coupled to or meshingly engaged with the first sun gear 80. The first planet carrier plate 84 supports each of the first planet gears 82 for rotation.

The first ring gear 286 surrounds at least the first step 88 of first planet gears 82. In one example, the first ring gear 286 includes the plurality of straight or spur gear teeth 296 defined about an inner perimeter or inner circumference of the first ring gear 286, and a plurality of straight or second spur gear teeth 298 defined about an outer perimeter or circumference of the first ring gear 286. The spur gear teeth 296 of the first ring gear 286 are coupled to or meshingly engaged with the spur gear teeth associated with the first step 88 of each of the first planet gears 82 such that the first planet gears 82 drive the first ring gear 86. The second spur gear teeth 298 of the first ring gear 286 are coupled to or meshingly engaged with a plurality of straight or spur gear teeth associated with the differential lock subsystem 206. It should be noted that in certain examples, the first ring gear 286 may comprise a crown gear, with the second spur gear teeth 298 defined to extend outwardly from a plane that includes the spur gear teeth 296.

In one example, the second compound planetary gear set 72 includes the second sun gear 100, the second planet gears 102, the second planet carrier plate 104 and a second ring gear 306. The second sun gear 100 is coupled to the second reductor output shaft 69 of the second control lane 32 and is driven by the second reductor output shaft 69. The second sun gear 100 is coupled to or meshingly engaged with second planet gears 102 such that the second sun gear 100 drives the second planet gears 102. The gear teeth of the first step 108 of each of the second planet gears 102 are coupled to or meshingly engaged with the second ring gear 306 to drive the second ring gear 306. The gear teeth of the second step 110 of each of the second planet gears 102 are coupled to or meshingly engaged with the second output arm 76 to drive the second output arm 76. The gear teeth of the second step 110 are also coupled to or meshingly engaged with the second sun gear 100 to be driven by the second sun gear 100. The second planet carrier plate 104 supports each of the second planet gears 102 for rotation.

The second ring gear 306 surrounds at least the first step 108 of second planet gears 102. In one example, the second ring gear 306 includes the plurality of straight or spur gear teeth 316 defined about an inner perimeter or inner circumference of the second ring gear 306, and a plurality of straight or second spur gear teeth 318 defined about an outer perimeter or circumference of the second ring gear 306. The spur gear teeth 316 of the second ring gear 306 are coupled to or meshingly engaged with the spur gear teeth of the first step 108 of each of the second planet gears 102 such that the second planet gears 102 drive the second ring gear 306. The second spur gear teeth 318 of the second ring gear 306 are coupled to or meshingly engaged with a plurality of straight or spur gear teeth associated with the differential lock subsystem 206. It should be noted that in certain examples, the second ring gear 306 may comprise a crown gear, with the second spur gear teeth 318 defined to extend outwardly from a plane that includes the spur gear teeth 316.

The first output arm 74 is coupled to the first compound planetary gear set 270 to be driven by the first compound planetary gear set 270, and the second output arm 76 is coupled to the second compound planetary gear set 272 to be driven by the second compound planetary gear set 272, which provides two separate load paths to the primary flight control surface 22. The second ends of the first output arm 74 and the second output arm 76 are each coupled to the primary flight control surface 22 to move the primary flight control surface 22.

The differential lock subsystem 206 is enclosed in the second actuator housing 240. The differential lock subsystem 206 is coupled to the first ring gear 286 and the second ring gear 306, and is in communication with the controller 26. The differential lock subsystem 206 is in communication with the controller 26 over a communication architecture that enables the transfer of data, power and commands, including, but not limited to, a bus. In one example, the differential lock subsystem 206 includes the third brake 150, a third speed reductor 352 and a gear coupling in the form of a spur gear set 354.

The third brake 150 is coupled to the input shaft 156 of the third speed reductor 352, and is in communication with the controller 26. In one example, the third brake 150 is responsive to one or more control signals from the controller 26 to inhibit a rotation of the input shaft 156, and thus, the spur gear set 354.

The third speed reductor 352 is a gear set, and includes, but is not limited to, a planetary gear set, spur gear set, bevel gear set, harmonic gear set, cycloidal gear set, or similar functioning gear sets. In this example, the third speed reductor 352 comprises a planetary gear set having the input shaft 156 and an output shaft 358, which is concentric with the input shaft 156. The third speed reductor 352 may increase a speed of the output shaft 358 by about 1 to about 1000 and decrease a torque of the output shaft 358 by about 1 to about 0.001. The input shaft 156 of the third speed reductor 352 is coupled to the third brake 150 to enable the third brake 150 to apply a brake torque to inhibit a rotation of the input shaft 156, and thus, the output shaft 358. The output shaft 358 is coupled to the spur gear set 354. It should be noted that in certain instances the third brake 150 may be designed to match the load capacity of the torque of the output shaft 358, and the third speed reductor 352 may not be present. In this instance, the third brake 150 may be coupled directly to or connected directly with the output shaft 358.

The spur gear set 354 is coupled to the output shaft 358 so as to form a gear coupling that rotates with the output shaft 358 and is driven by the first ring gear 286 and the second ring gear 306. In one example, the spur gear set 354 includes a first spur gear 360, a second spur gear 362 and a third spur gear 364. The first spur gear 360 includes a plurality of straight or spur gear teeth 366 about a perimeter or circumference of the first spur gear 360. The second spur gear 362 is a stepped spur gear, and includes a plurality of straight or spur gear teeth 368 about a perimeter or circumference of the second spur gear 362 at a first step, and a plurality of straight or second spur gear teeth 370 about a perimeter or circumference of the second spur gear 362 at a second step. The third spur gear 364 is a stepped spur gear, and includes a plurality of straight or spur gear teeth 372 about a perimeter or circumference of the third spur gear 364 at a first step, and a plurality of straight or second spur gear teeth 374 about a perimeter or circumference of the third spur gear 364 at a second step.

Figure 4:
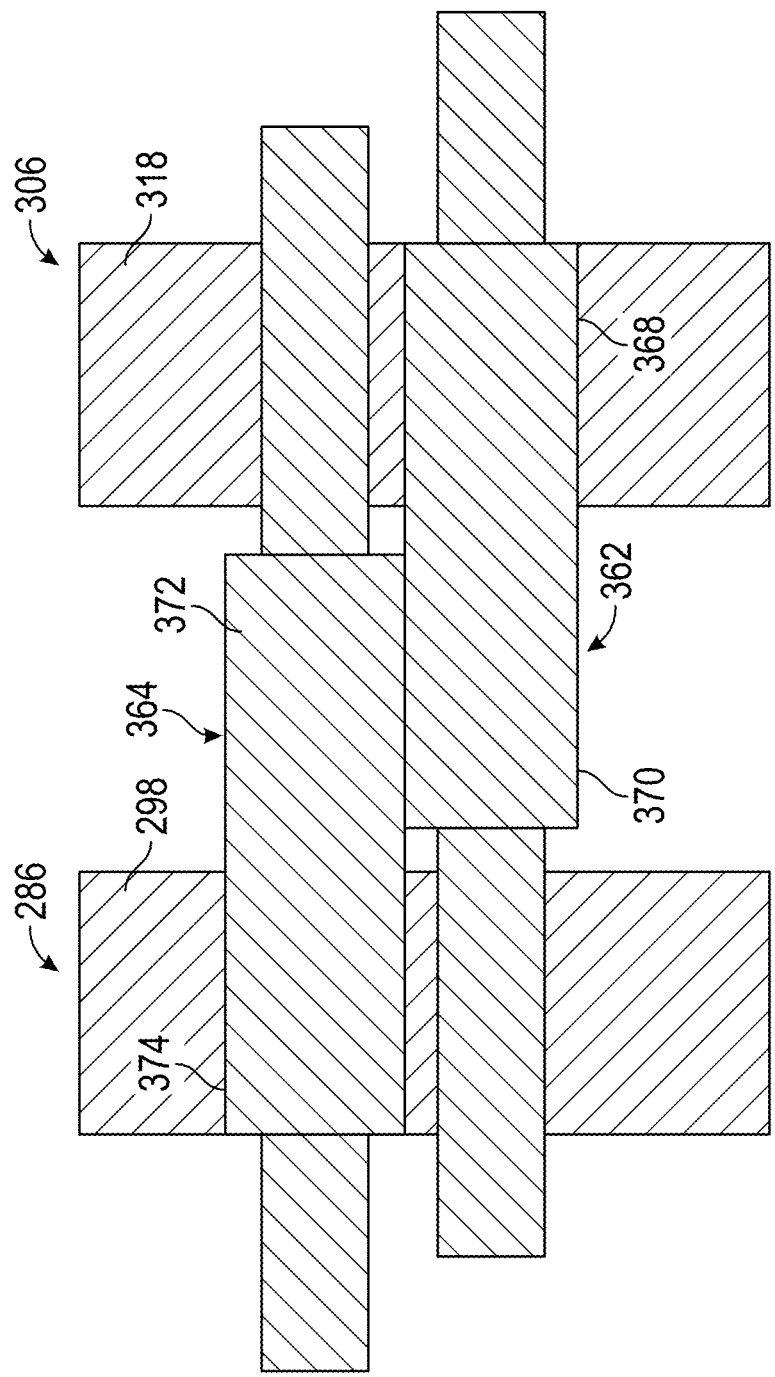
FIG. 4 is a schematic illustration of a portion of the differential lock system coupled to the actuator system of FIG. 3.

The first spur gear 360 is coupled to the output shaft 358. The gear teeth 366 of the first spur gear 360 are coupled to or meshingly engaged with the gear teeth 368 of the second spur gear 362 to rotate with the second spur gear 362. The gear teeth 370 of the second spur gear 362 are coupled to or meshingly engaged with the gear teeth 318 of the second ring gear 306 such that the second spur gear 362 rotates with the second ring gear 306. In this example, with reference to FIG. 4, the gear teeth 370 of the second spur gear 362 are also coupled to or meshingly engaged with the gear teeth 372 of the third spur gear 364 such that the second spur gear 362 rotates with the third spur gear 364. Note that in FIG. 4, the steps of the second spur gear 362 and the third spur gear 364 are not illustrated. The shafts shown in FIG. 4 are to support the second spur gear 362 and the third spur gear 364.

With reference back to FIG. 3, the gear teeth 374 of the third spur gear 364 are coupled to or meshingly engaged with the gear teeth 298 of the first ring gear 286 such that the third spur gear 364 rotates with the first ring gear 286. As will be discussed, the third brake 150 is responsive to one or more control signals from the controller 26 to engage and move the differential lock subsystem 206 to a first, locked state in which the rotation of the output shaft 358, and thus, the spur gear set 354 is inhibited. When the rotation of the spur gear set 354 is inhibited, the first ring gear 286 and the second ring gear 306 are also inhibited from rotation and held fixed relative to the center section 286c of the actuator housing 238. With the first ring gear 286 and the second ring gear 306 inhibited from rotating, the actuator system 200 is a torque-summing speed reducer in the first, locked state of the differential lock subsystem 206. Conversely, when the third brake 150 is not engaged and the differential lock subsystem 206 is in a second, unlocked state, the spur gear set 354 is free to rotate with the first ring gear 286 and the second ring gear 306. As the first ring gear 286 and the second ring gear 306 rotate in the opposite directions at about the same velocity, the actuator system 200 is a velocity-summing speed reducer in the second, unlocked state of the differential lock subsystem 206.

Figure 5:
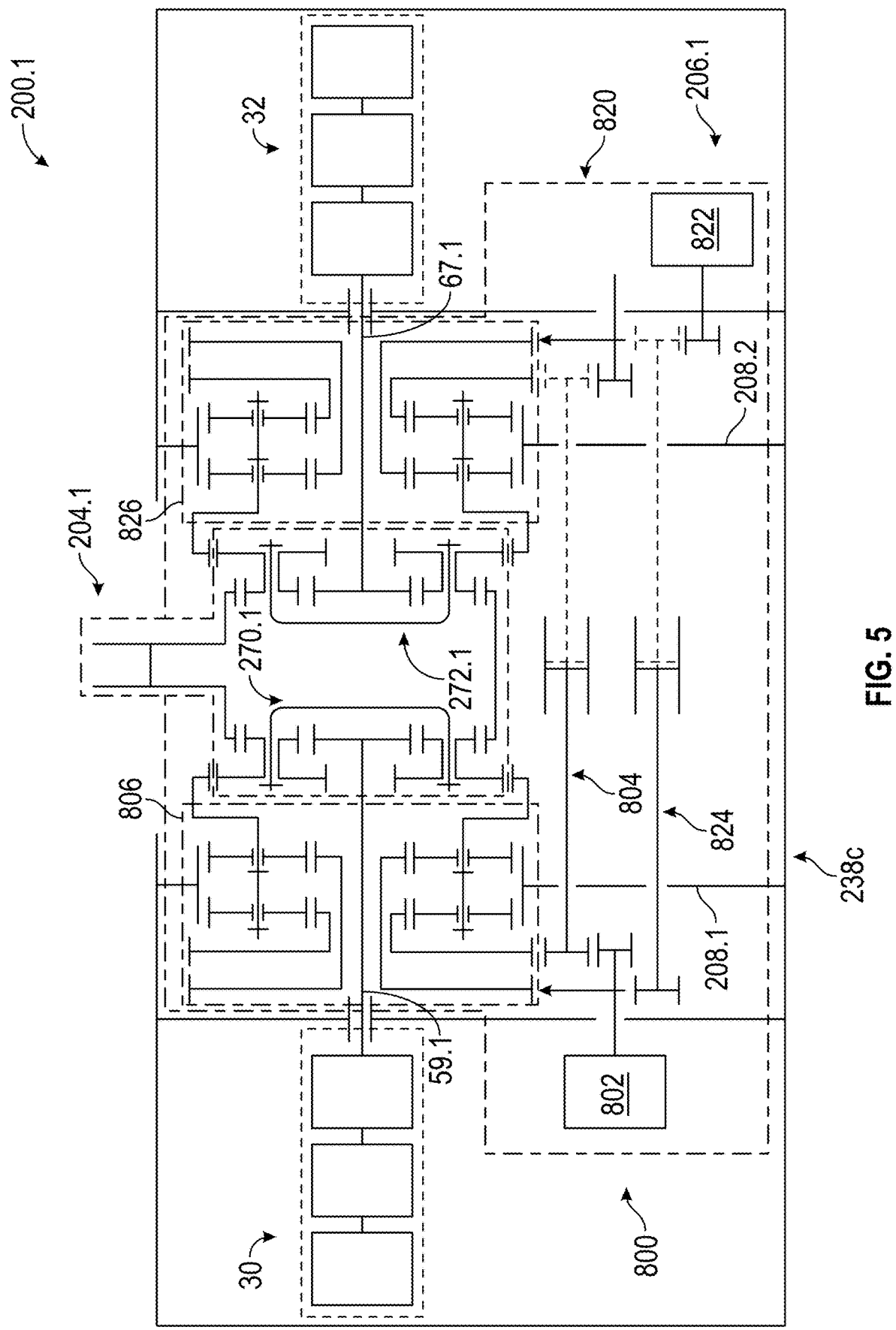
FIG. 5 is a schematic illustration of another exemplary actuator system and differential lock system for moving the flight control surface associated with the aerial vehicle of FIG. 1.
Figure 6:
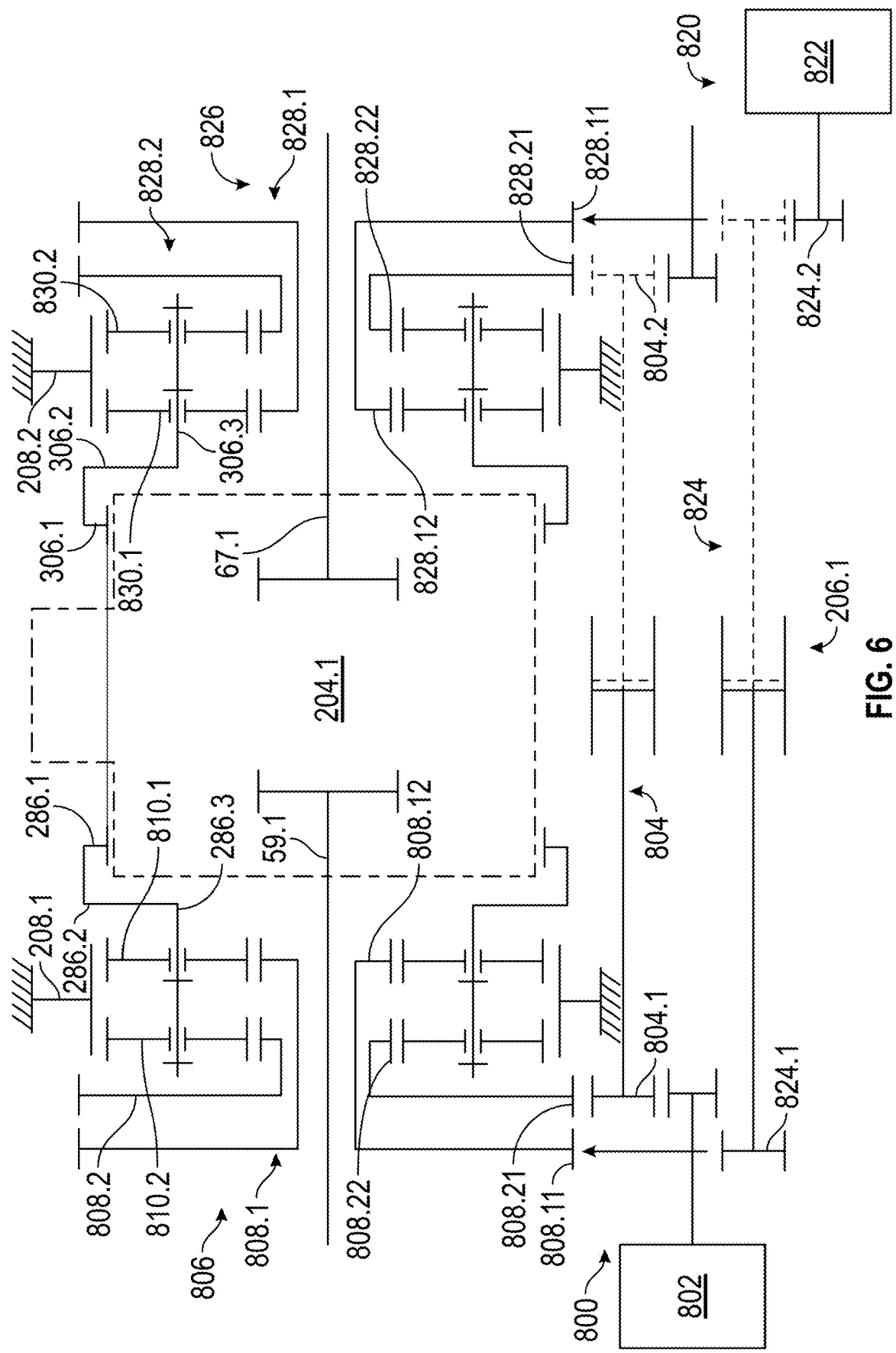
FIG. 6 is a schematic illustration of the differential lock subsystem shown in FIG. 5.

With reference now to FIGS. 5 and 6, another example of the actuator system 200.1 configured to provide a redundant differential lock subsystem 206.1 is shown. The actuator system 200.1 like actuator system 24 shown in FIG. 1, may be coupled to the aerial vehicle 20 to move the flight control surface 22. The actuator system 200.1 includes components that are similar to and/or the same in function as components of the actuator system 200 discussed with regard to FIGS. 3-4. Thus, similar reference numbers will be used in FIGS. 5 and 6 to denote or identify those same or similar components. For the sake of brevity, these components, which are substantially similar in features and functions to those described in reference to FIG. 3 above, will not be described again.

Figure 3:
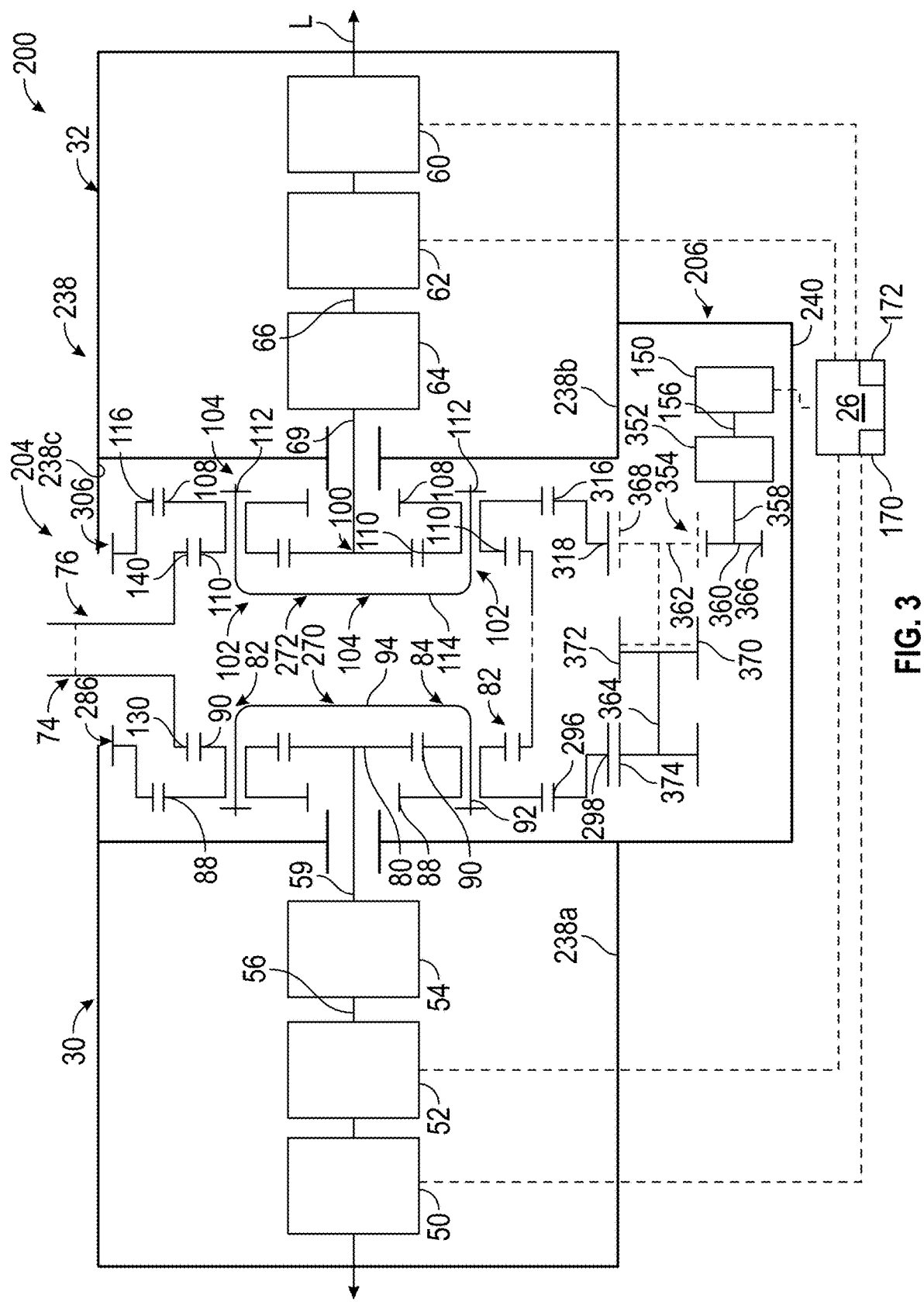
FIG. 3 is a schematic illustration of another exemplary actuator system and differential lock system for moving the flight control surface associated with the aerial vehicle of FIG. 1.

With continued reference to FIG. 5, the actuator system 200.1 includes the first control lane 30, the second control lane 32 as described in FIG. 3, as well as a differential subsystem 204.1 and a differential lock subsystem 206.1. The differential subsystem 204.1 and the differential lock subsystem 206.1 are located within the center section 238c. The center section 238c further includes a fixed first ring gear 208.1 and a fixed second ring gear 208.2 fixed thereto or formed thereon. The first and second ring gears 208.1, 208.2 include a plurality of straight or spur gear teeth about an inner perimeter or an inner circumference thereof.

The first control lane 30 and the second control lane 32 are coupled to the differential subsystem 204.1, and are communicatively coupled to the controller (not shown) similar to the actuator system 200 described above and illustrated in FIG. 3. The first control lane 30 is coupled to the first compound planetary gear set 270.1 via the first reducer output shaft 59.1. The second control lane 32 is coupled to the second compound planetary gear set 272.1 via the second reducer output shaft 67.1. The differential subsystem 204.1 is coupled to the flight control surface in a manner similar to differential subsystem 204 described above and illustrated in FIG. 3. The differential subsystem 204.1 is also coupled to the differential lock subsystem 206.1 which is electrically coupled to and in communication with a controller (not shown) similar to differential lock subsystem 206 described above and illustrated in FIG. 3.

The differential lock subsystem 206.1 includes a third brake train 800 having a third brake 802, a spur gear set 804 and a dual planetary gear set 806 and a fourth brake train 820 having a fourth brake 822, a spur gear set 824 and another dual planetary gear set 826. The spur gear sets 804, 824 form a gear coupling between the third and fourth brake trains 800, 820 and the differential subsystem 204.1 in a manner similar in features and functions to the spur gear set 354 described in reference to FIG. 3.

With reference now to FIG. 6, the third and fourth dual planetary gear sets 806, 826 are operably coupled to the third brake 802 via the spur gear set 804 of the third brake train 800 and to the fourth brake 822 via the spur gear set 824 of the fourth brake train 820, respectively.

The third dual planetary gear set 806 includes an inner sun gear 808.1 and an outer sun gear 808.2 rotatably supported on the reductor output shaft 59.1 of the first control lane 30. Each of the inner and outer sun gears 808.1, 808.2 have a first stage 808.11, 808.21 and a second stage 808.12, 808.22. The fourth dual planetary gear set 826 includes an inner sun gear 828.1 and an outer sun gear 828.2 rotatably supported on the reducer output shaft 63.1 of the second control lane 32. Each of the inner and outer sun gears 828.1, 828.2 have a first stage 828.11, 828.21 and a second stage 828.12, 828.22.

The spur gear set 804 forms a gear coupling with the output shaft of the third brake 802 and the first stage 808.21 of the outer sun gear 808.2 via a spur gear 804.1 and with the first stage 828.21 of the outer sun gear 828 via spur gear 804.2. The spur gear set 824 forms a gear coupling with the output shaft of the fourth brake 822 and the first stage 808.11 of the inner sun gear 808.1 via spur gear 824.1 and with the first stage 828.11 of inner sun gear 828.1 via spur gear 824.2.

The third and fourth dual planetary gear sets 806, 826 are also operably coupled to the differential subsystem 204.1 via the first and second ring gears 286.1, 306.1. In particular, the first ring gear 286.1 includes a carrier plate portion 286.2 with one or more axle shafts 286.3 extending therefrom. Axle shafts 286.3 support a set of inner planet gears 810.1 and a set of outer planet gear 810.2 (collectively referred to as a third set of planet gears 810) in the third dual planetary gear set 806 of the differential locking subsystem 206.1. The inner and outer planet gears 810.1, 810.2 are operably coupled between the fixed ring gear 208.1 and the second stage 808.12, 808.22 of inner and outer sun gear 808.1, 808.2, respectively. Likewise, the second ring gear 306.1 includes a carrier plate portion 306.2 with one or more axle shafts 306.3 extending therefrom. Axle shafts 306.3 support a set of inner planet gears 830.1 and a set of outer planet gear 830.2 (collectively referred to as a fourth set of planet gears 830) in the fourth dual planetary gear set 826 of the differential locking subsystem 206.1. The inner and outer planet gears 830.1, 830.2 are operably coupled between the fixed ring gear 208.2 and the second stage 828.12, 828.22 of inner and outer sun gear 828.1, 828.2, respectively.

Selective operation of the third brake train 800 and/or the fourth brake train 820 provides a redundancy in structure and features to ensure that the actuator system 200.1 is capable of switching between a velocity-summing mode and a torque-summing mode during normal operations as well as switching between a reduced velocity-summing mode and a reduced torque-summing mode during a fault condition.

In one form, the third and fourth brakes 802, 822 are rotating shaft failsafe brakes and the third and fourth compound gear sets 806, 826 function as speed reducers between the third and fourth brakes 802, 822 and the differential subsystem 204.1. The third and fourth brakes 802, 822 are in communication with the controller 26 and responsive to one or more control signals to inhibit a rotation of the output shaft, and thus, the rotation of the third and fourth spur gear sets 804, 824. Thus, in this example, the third and fourth brakes 802, 822 is electrically actuated, but in other embodiments may be actuated by some other means (e.g., hydraulically). In one example, the third brake 802 prevents or lock shaft rotation of the third and fourth dual gear set 806, 826, when engaged, such as the controller 26 removes power from the third brake 802 or no power is supplied to the third brake 802. On the other hand, the third brake 802 is disengaged and is unlocked to allow the shaft rotation of the third and fourth compound gear sets 806, 826 when the controller 26 provides power to the third brake 802. In another example, the fourth brake 822 prevents or lock shaft rotation of the third and fourth dual gear set 806, 826, when engaged, such as the controller 26 removes power from the fourth brake 822 or no power is supplied to the fourth brake 822. On the other hand, the fourth brake 822 is disengaged and is unlocked to allow the shaft rotation of the third and fourth dual ger set 806, 826 when the controller 26 provides power to the fourth brake 822.

Figure 7:
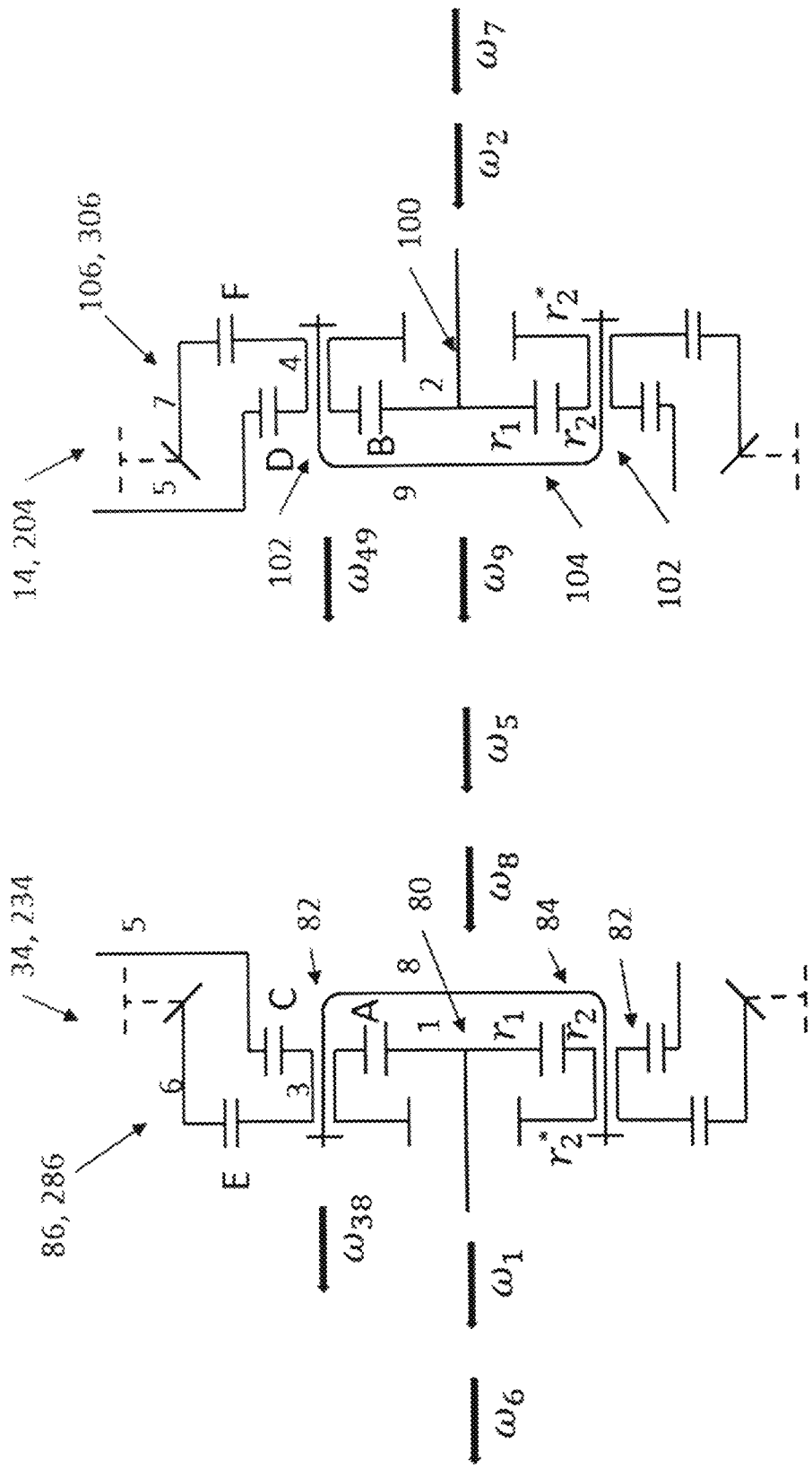
FIG. 7 is a simplified schematic illustration of a portion of an exemplary actuator system, which illustrates variables used for determining an output angular velocity of the in accordance with various embodiments.

With reference to FIG. 7, a simplified diagram of the differential subsystem 34, 204 is shown to illustrate the operation of the actuator system 24, 200 in as a torque-summing speed reducer or a velocity-summing speed reducer. The following equations (1) through (6) express the no-slip condition at points of contact, A through F, illustrated in FIG. 6, of the respective gears 80, 82, 86, 286, 130, 100, 102, 106, 306 in meshed contact. For example, the equation (1) represents the no-slip condition between the first sun gear 80 and the first planet gears 82 by equating the velocities of both gears at the point of contact:

$$A: \omega_1 r_1 = \omega_8(r_1+r_2) - \omega_{38} r_2 \quad (1)$$

$$B: \omega_1 r_1 = \omega_9(r_1+r_2) - \omega_{49} r_2 \quad (2)$$

$$C: \omega_5(r_1+2r_2) = \omega_8(r_1+r_2) + \omega_{38} r_2 \quad (3)$$

$$D: \omega_5(r_1+2r_2) = \omega_9(r_1+r_2) + \omega_{49} r_2 \quad (4)$$

$$E: \omega_6(r_1+r_2+r^*_2) = \omega_8(r_1+r_2) + \omega_{38} r^*_2 \quad (5)$$

$$F: \omega_7(r_1+r_2+r^*_2) = \omega_9(r_1+r_2) + \omega_{49} r^*_2 \quad (6)$$

Wherein $\omega_1$ is the angular velocity of the first sun gear 80 and $r_1$ is the radius of the first sun gear 80 and the second sun gear 100; $\omega_2$ is the angular velocity of the second sun gear 100; $r_2$ is the radius of the second step 90 of first planet gears 82 and the radius of the second step 110 of second planet gears 102; $r^*_2$ is the radius of the first step 88 of first planet gears 82 and the radius of the first step 108 of second planet gears 102; $\omega_{38}$ is the angular velocity of each of the first planet gears 82 in a reference frame attached to first planet carrier plate 84; $\omega_{49}$ is the angular velocity of each of the second planet gears 102 in a reference frame attached to planet carrier plate 104; $\omega_5$ is the angular velocity of each of the first output arm 74 and the second output arm 76; $\omega_6$ is the angular velocity of the first ring gear 86; $\omega_7$ is the angular velocity of the second ring gear 106; $\omega_8$ is the angular velocity of the first planet carrier plate 84; and $\omega_9$ is the angular velocity of the second planet carrier plate 104.

Equations (1), (3) and (5) are combined to determine the relationship between the angular velocities of first sun gear 80, the first ring gear 86, 286 and the first output arm 74:

$$L: \omega_5(r_1+2r_2) = \omega_1 r_1 + 2 \cdot \frac{\omega_6 r_2(r_1+r_2+r^*_2) - \omega_1 r_1 r_2}{r_2 + r^*_2} \quad (7)$$

L refers to the first compound planetary gear set 70, 270, which is depicted on the left-hand side of FIG. 7. Equations (2), (4) and (6) are combined to determine the relationship between the angular velocities of the second sun gear 100, the second ring gear 106, 306 and the second output arm 76:

$$R: \omega_5(r_1+2r_2) = \omega_2 r_1 + 2 \cdot \frac{\omega_7 r_2(r_1+r_2+r^*_2) - \omega_2 r_1 r_2}{r_2 + r^*_2} \quad (8)$$

R refers to the second compound planetary gear set 72, 272, which is depicted on the right-hand side of FIG. 7.

In order to determine the output angular velocity of the actuator system 24, 200, when the third brake 150 is engaged such that the ring gears 86, 286, 106, 306 are fixed or immovable, the angular velocity of the ring gears 86, 286, 106, 306 is zero or:

$$\omega_6 = \omega_7 = 0 \quad (9)$$

Substituting equation (9) into equation (7) with the angular velocity of the ring gears 86, 286, 106, 306 as zero results in:

$$\omega_5(r_1+2r_2) = \omega_1 r_1 - 2 \cdot \frac{\omega_1 r_1 r_2}{r_2 + r^*_2} \quad (10)$$

Substituting equation (9) into equation (8) with the angular velocity of the ring gears 86, 286, 106, 306 as zero results in:

$$\omega_5(r_1+2r_2) = \omega_2 r_1 - 2 \cdot \frac{\omega_2 r_1 r_2}{r_2 + r^*_2} \quad (11)$$

By comparing equations (10) and (11), it is evident that the angular velocity $\omega_1$ of the first sun gear 80 and the angular velocity $\omega_2$ of the second sun gear 100 are the same, denoted as $\omega_1$, and solving equations (10) and (11) for the combined angular velocity $\omega_5$ for the output arms 74, 76 results in:

$$\omega_5 = \omega_I \cdot \frac{r_1}{r_1 + 2r_2}\left(1 - \frac{2r_2}{r_2 + r_2^*}\right) \qquad (12)$$

Thus, when the third brake 150 is engaged and the differential lock subsystem 36, 206 is in the first, locked state, the actuator system 24, 200 is a torque-summing speed reducer and the angular velocity $\omega_5$ of the output arms 74, 76 is provided by equation (12).

To determine the output angular velocity of the actuator system 24, 200, when the third brake 150 is disengaged such that the ring gears 86, 286, 106, 306 are movable and the differential lock subsystem 36, 206 is in the second, unlocked state, assuming that the ring gears 86, 286, 106, 306 rotate in opposite directions at the same speeds is represented by:

$$\omega_6 = -\omega_7 = \omega_D \qquad (13)$$

Substituting equation (13) into equation (7) results in:

$$\omega_5(r_1 + 2r_2) = \omega_1 r_1 + 2 \cdot \frac{\omega_D r_2 (r_1 + r_2 + r_2^*) - \omega_1 r_1 r_2}{r_2 + r_2^*} \qquad (14)$$

Substituting equation (13) into equation (8) results in:

$$\omega_5(r_1 + 2r_2) = \omega_2 r_1 + 2 \cdot \frac{-\omega_D r_2 (r_1 + r_2 + r_2^*) - \omega_2 r_1 r_2}{r_2 + r_2^*} \qquad (15)$$

Solving both equations (14) and (15) for the combined angular velocity os for the output arms 74, 76 results in:

$$\omega_5 = \frac{\omega_1 + \omega_2}{2} \cdot \frac{r_1}{r_1 + 2r_2}\left(1 - \frac{2r_2}{r_2 + r_2^*}\right) \qquad (16)$$

Thus, when the third brake 150 is disengaged and the differential lock subsystem 36, 206 is in the second, unlocked state, the actuator system 24, 200 is a velocity-summing speed reducer and the angular velocity $\omega_5$ of the output arms 74, 76 is provided by equation (16).

Generally, when acting as a torque-summing speed reducer, the third brake 150 is responsive to one or more control signals from the controller 26 to engage so that the ring gears 86, 286, 106, 306 are fixed or immovable. With the ring gears 86, 286, 106, 306 fixed or immovable, the first motor 52 and the second motor 62 are responsive to one or more control signals from the controller 26 to drive the respective speed reductor 54, 64. The speed reductors 54, 64 drive the respective sun gear 80, 100. The sun gears 80, 100, in turn, drive the respective planet gears 82, 102, which are supported by the planet carrier plate 84, 104. The planet gears 82, 102, in turn, drive the respective output arms 74, 76 to move the primary flight control surface 22.

When acting as a velocity-summing speed reducer, with the third brake 150 disengaged and the ring gears 86, 286, 106, 306 are rotatable in opposite directions, the first motor 52 and the second motor 62 are responsive to one or more control signals from the controller 26 to drive the respective speed reductor 54, 64. The speed reductors 54, 64 drive the respective sun gear 80, 100. The sun gears 80, 100, in turn, drive the respective planet gears 82, 102, which are supported by the planet carrier plate 84, 104. The planet gears 82, 102, in turn, drive the respective ring gears 86, 286, 106, 306 and output arms 74, 76 to move the primary flight control surface 22.

Figure 8:
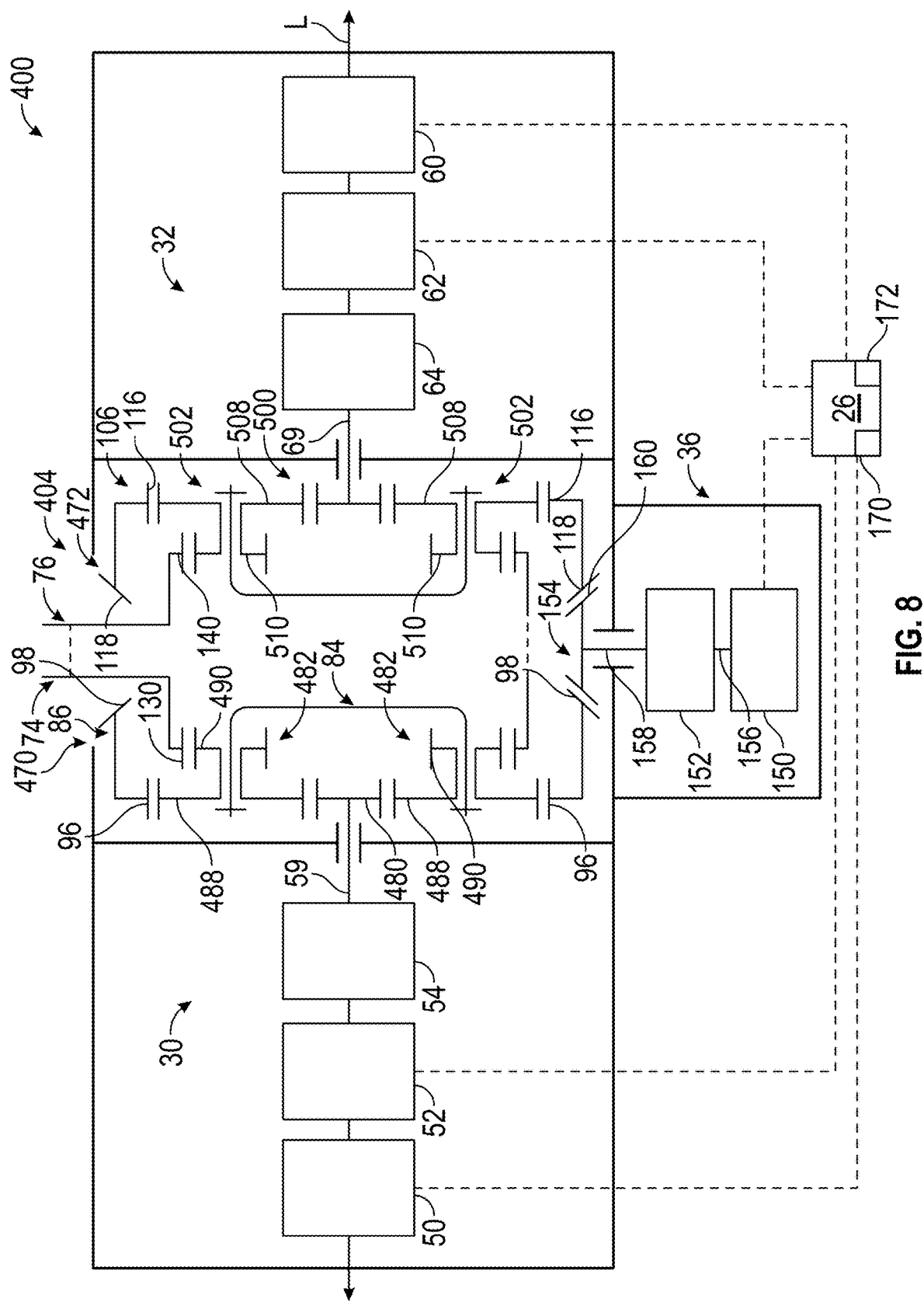
FIG. 8 is a schematic illustration of another exemplary actuator system for moving the flight control surface associated with the aerial vehicle of FIG. 1 in accordance with various embodiments.

It should be noted that while the actuator system 24 is described herein as including the differential subsystem 34 coupled to the sun gear 80, 100 to drive the first ring gear 86 and the second ring gear 106, the actuator system 24 may be configured differently to drive the first ring gear 86 and the second ring gear 106. In one example, with reference to FIG. 8, an actuator system 400 is shown, which may be coupled to the aerial vehicle 20 to move the primary flight control surface 22. As the actuator system 400 includes components that are the same or similar to components of the actuator system 24 discussed with regard to FIGS. 1-2, the same reference numerals will be used to denote the same or similar components. In one example, the actuator system 400 includes the first control lane 30, the second control lane 32, a differential subsystem 404 and the differential lock subsystem 36. The first control lane 30, the second control lane 32, and the differential subsystem 404 may be contained within the actuator housing 38. The differential lock subsystem 36 may be contained within the second actuator housing 40. The first control lane 30 may be positioned opposite the second control lane 32 along a longitudinal axis L of the actuator system 400, and indirectly coupled to the primary flight control surface 22 (FIG. 1) via the differential subsystem 34.

The first control lane 30 includes the first brake 50, the first motor 52 and the first speed reducer 54. The first speed reducer 54 is coupled to the differential subsystem 404 to drive a portion of the differential subsystem 404. The second control lane 32 includes the second brake 60, the second motor 62, and the second speed reducer 64. The second speed reducer 64 is coupled to the differential subsystem 404 to drive a portion of the differential subsystem 404. The first motor 52 and/or the second motor 62 may also directly drive the differential subsystem 404. The first control lane 30 and/or the second control lane 32 need not include the respective one of the first brake 50 and the second brake 60 based on the configuration of the respective first speed reductor 54 and the second speed reductor 64.

The differential subsystem 404 is coupled to the first speed reducer 54 and the second speed reducer 64. The differential subsystem 404 is also coupled to the differential lock subsystem 36 and the primary flight control surface 22. In one example, the differential subsystem 404 includes a first compound planetary gear set 470, a second compound planetary gear set 472, the first output arm 74 and the second output arm 76. The first compound planetary gear set 470 is coupled to the first control lane 30, and the second compound planetary gear set 472 is coupled to the second control lane 32.

In one example, the first compound planetary gear set 470 includes a first sun gear 480, at least one first planet gear 482, the first planet carrier plate 84 and the first ring gear 86. The first sun gear 480 is coupled to the first reductor output shaft 59 of the first control lane 30 and is driven by the first reductor output shaft 59. In one example, the first sun gear 480 includes a plurality of straight or spur gear teeth about a perimeter or circumference of the first sun gear 480. The gear teeth of the first sun gear 480 are coupled to or meshingly engaged with a plurality of straight or spur gear teeth associated with the at least one first planet gear 482 such that the first sun gear 480 drives the at least one first planet gear 482.

In one example, the at least one first planet gear 482 comprises two or more first planet gears 482. For example, the first compound planetary gear set 470 may include four first planet gears 482. In this example, each of the first planet gears 482 comprises a stepped planet gear, and includes a first step 488 and a second step 490. Each of the first step 488 and the second step 490 include a plurality of straight or spur gear teeth, which extend about a perimeter or circumference of the first planet gear 482 at the respective one of the first step 488 and the second step 490. The gear teeth of the first step 488 are coupled to or meshingly engaged with a plurality of straight or spur gear teeth associated with the first ring gear 86 to drive the first ring gear 86. The gear teeth of the first step 488 are also coupled to or meshingly engaged with the gear teeth of the first sun gear 480 to be driven by the first sun gear 480. The gear teeth of the second step 90 are coupled to or meshingly engaged with a plurality of straight or spur gear teeth associated with the first output arm 74 to drive the first output arm 74. The first planet carrier plate 84 supports each of the first planet gears 482 for rotation.

The first ring gear 86 surrounds at least the first step 488 of the first planet gears 482. The spur gear teeth 96 of the first ring gear 86 are coupled to or meshingly engaged with the spur gear teeth associated with the first step 488 of each of the first planet gears 482 such that the first planet gears 482 drive the first ring gear 86. The bevel gear teeth 98 of the first ring gear 86 are coupled to or meshingly engaged with the bevel gear 154 associated with the differential lock subsystem 36.

In one example, the second compound planetary gear set 472 includes a second sun gear 500, at least one second planet gear 502, the second planet carrier plate 104 and the second ring gear 106. The second sun gear 500 is coupled to the second reductor output shaft 69 of the second control lane 32 and is driven by the second reductor output shaft 69. In one example, the second sun gear 500 includes a plurality of straight or spur gear teeth about a perimeter or circumference of the second sun gear 500. The gear teeth of the second sun gear 500 are coupled to or meshingly engaged with a plurality of straight or spur gear teeth associated with the at least one second planet gear 502 such that the second sun gear 500 drives the at least one second planet gear 502.

In one example, the at least one second planet gear 502 comprises two or more second planet gears 502. For example, the second compound planetary gear set 472 may include four second planet gears 502. In this example, each of the second planet gears 502 comprises a stepped planetary gear, and includes a first step 508 and a second step 510. Each of the first step 508 and the second step 510 include a plurality of straight or spur gear teeth, which extend about a perimeter or circumference of the respective second planet gear 502 at the respective one of the first step 508 and the second step 510. The gear teeth of the first step 508 are coupled to or meshingly engaged with a plurality of straight or spur gear teeth associated with the second ring gear 106 to drive the second ring gear 106. The gear teeth of the first step 508 are also coupled to or meshingly engaged with the gear teeth of the second sun gear 500 to be driven by the second sun gear 500. The gear teeth of the second step 510 are coupled to or meshingly engaged with a plurality of straight or spur gear teeth associated with the second output arm 76 to drive the second output arm 76. The second planet carrier plate 104 supports each of the second planet gears 502 for rotation.

The second ring gear 106 surrounds at least the first step 508 of the second planet gears 502. The spur gear teeth 116 of the second ring gear 106 are coupled to or meshingly engaged with the spur gear teeth associated with the first step 508 of each of the second planet gears 502 such that the second planet gears 502 drive the second ring gear 106. The bevel gear teeth 118 of the second ring gear 106 are coupled to or meshingly engaged with a plurality of bevel gear teeth associated with the bevel gear 154 of the differential lock subsystem 36.

The first output arm 74 is coupled to the first compound planetary gear set 470 to be driven by the first compound planetary gear set 470, and the second output arm 476 is coupled to the second compound planetary gear set 472 to be driven by the second compound planetary gear set 472, which provides two separate load paths to the primary flight control surface 22. The spur gear teeth 130 of the first output arm 74 are coupled to or meshingly engaged with the spur gear teeth of the second step 490 of each of the first planet gears 582. The second end of the first output arm 74 is coupled to the primary flight control surface 22 to move the primary flight control surface 22. The spur gear teeth 140 of the second output arm 76 are coupled to or meshingly engaged with the spur gear teeth of the second step 510 of each of the second planet gears 502. A second end of the second output arm 76 is coupled to the primary flight control surface 22 to move the primary flight control surface 22.

The differential lock subsystem 36 is coupled to the first ring gear 86 and the second ring gear 106, and is in communication with the controller 26. The differential lock subsystem 36 includes the third brake 150, the third speed reductor 152 and a gear coupling in the form of the bevel gear 154. The third brake 150 is coupled to the third speed reductor 152, and is in communication with the controller 26. In one example, the third brake 150 is coupled to an input shaft 156 of the third speed reductor 152, and is responsive to one or more control signals from the controller 26 to inhibit a rotation of the input shaft 156, and thus, the bevel gear 154. The third speed reductor 152 comprises the planetary gear set having the input shaft 156 and the output shaft 158, which is concentric with the input shaft 156. The input shaft 156 of the third speed reductor 152 is coupled to the third brake 150 to enable the third brake 150 to apply a brake torque to inhibit a rotation of the input shaft 156, and thus, the output shaft 158. The output shaft 158 is coupled to the bevel gear 154. It should be noted that in certain instances the third speed reductor 152 may not be present and the third brake 150 may be coupled directly to or connected directly with the output shaft 158.

The bevel gear 154 is coupled to the output shaft 158 so as to rotate with the output shaft 158 and is driven by the first ring gear 86 and the second ring gear 106. Generally, the first ring gear 86 and the second ring gear 106 rotate in opposite directions at about the same velocity due to the coupling of the bevel gear 154 between the first ring gear 86 and the second ring gear 106. The bevel gear teeth 160 of the bevel gear 154 are coupled to or meshingly engaged with the bevel gear teeth 98 of the first ring gear 86 and the bevel gear teeth 118 of the second ring gear 106 such that the first ring gear 86 and the second ring gear 106 drive the bevel gear 154. It should be noted that while a single bevel gear 154 is described and illustrated herein, a pair of bevel gears may be employed.

The third brake 150 is responsive to one or more control signals from the controller 26 to engage and move the differential lock subsystem 36 to a first, locked state in which the rotation of the output shaft 158, and thus, the bevel gear 154 is inhibited. When the rotation of the bevel gear 154 is inhibited, the first ring gear 86 and the second ring gear 106 are also inhibited from rotation and held fixed relative to the actuator housing 38. With the first ring gear 86 and the second ring gear 106 inhibited from rotating, the actuator system 400 is a torque-summing speed reducer in the first, locked state of the differential lock subsystem 36. Conversely, when the third brake 150 is not engaged and the differential lock subsystem 36 is in a second, unlocked state, the bevel gear 154 is free to rotate with the first ring gear 86 and the second ring gear 106. As the first ring gear 86 and the second ring gear 106 rotate in the opposite directions at about the same velocity, the actuator system 400 is a velocity-summing speed reducer in the second, unlocked state of the differential lock subsystem 36.

Generally, when acting as a torque-summing speed reducer, the third brake 150 is responsive to one or more control signals from the controller 26 to engage so that the ring gears 86, 286, 106, 306 are fixed or immovable. With the ring gears 86, 106 fixed or immovable, the first motor 52 and the second motor 62 are responsive to one or more control signals from the controller 26 to drive the respective speed reducer 54, 64. The speed reducers 54, 64 drive the respective sun gear 480, 500. The sun gears 480, 500, in turn, drive the respective planet gears 482, 502, which are supported by the planet carrier plate 84, 104. The planet gears 482, 502, in turn, drive the respective output arms 74, 76 to move the primary flight control surface 22.

When acting as a velocity-summing speed reducer, with the third brake 150 disengaged and the ring gears 86, 106 rotatable in opposite directions, the first motor 52 and the second motor 62 are responsive to one or more control signals from the controller 26 to drive the respective speed reducer 54, 64. The speed reducers 54, 64 drive the respective sun gear 480, 500. The sun gears 480, 500, in turn, drive the respective planet gears 482, 502, which are supported by the planet carrier plate 84, 104. The planet gears 482, 502, in turn, drive the respective ring gears 86, 106 and output arms 74, 76 to move the primary flight control surface 22. It should be noted that while the actuator system 400 is described and illustrated herein as including the ring gears 86, 106 and the differential lock subsystem 36, the ring gears 286, 306 and the differential lock subsystem 206 may also be employed, with the spur gear teeth 296 of the ring gears 286, 306 driven by the first step 488, 508 of the planet gears 482, 502.

Figure 9:
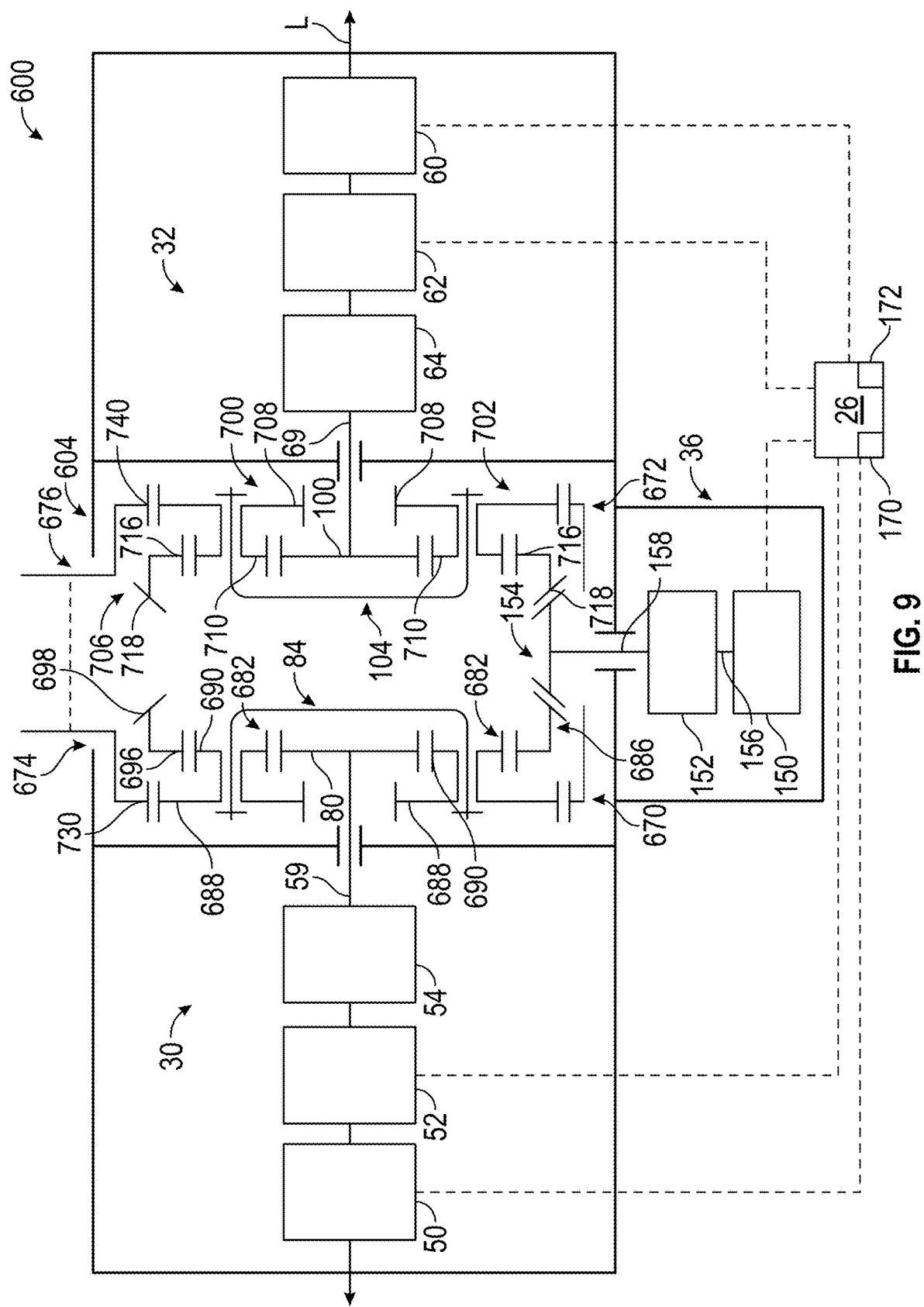
FIG. 9 is a schematic illustration of another exemplary actuator system for moving the flight control surface associated with the aerial vehicle of FIG. 1 in accordance with various embodiments.

It should be noted that while the actuator system 24 is described herein as including the differential subsystem 34 to drive the first output arm 74 and the second output arm 76, the actuator system 24 may be configured differently to drive the first output arm 74 and the second output arm 76. In one example, with reference to FIG. 9, an actuator system 600 is shown, which may be coupled to the aerial vehicle 20 to move the primary flight control surface 22 (FIG. 1). As the actuator system 600 includes components that are the same or similar to components of the actuator system 24 discussed with regard to FIGS. 1-2, the same reference numerals will be used to denote the same or similar components. In one example, the actuator system 600 includes the first control lane 30, the second control lane 32, a differential subsystem 604 and the differential lock subsystem 36. The first control lane 30, the second control lane 32, and the differential subsystem 604 may be contained within the actuator housing 38. The differential lock subsystem 36 may be contained within the second actuator housing 40. The first control lane 30 may be positioned opposite the second control lane 32 along a longitudinal axis L of the actuator system 600, and indirectly coupled to the primary flight control surface 22 (FIG. 1) via the differential subsystem 34.

The first control lane 30 includes the first brake 50, the first motor 52 and the first speed reducer 54. The first speed reducer 54 is coupled to the differential subsystem 604 to drive a portion of the differential subsystem 604. The second control lane 32 includes the second brake 60, the second motor 62, and the second speed reducer 64. The second speed reducer 64 is coupled to the differential subsystem 604 to drive a portion of the differential subsystem 604. The first motor 52 and/or the second motor 62 may also directly drive the differential subsystem 604. The first control lane 30 and/or the second control lane 32 need not include the respective one of the first brake 50 and the second brake 60 based on the configuration of the respective first speed reducer 54 and the second speed reducer 64.

The differential subsystem 604 is coupled to the first speed reducer 54 and the second speed reducer 64. The differential subsystem 604 is also coupled to the differential lock subsystem 36 and the primary flight control surface 22 (FIG. 1). In one example, the differential subsystem 604 includes a first compound planetary gear set 670, a second compound planetary gear set 672, a first output arm 674 and a second output arm 676. The first compound planetary gear set 670 is coupled to the first control lane 30, and the second compound planetary gear set 672 is coupled to the second control lane 32. In one example, the first compound planetary gear set 670 includes the first sun gear 80, at least one first planet gear 682, the first planet carrier plate 84 and a first ring gear 686.

The first sun gear 80 is coupled to the first reductor output shaft 59 of the first control lane 30 and is driven by the first reductor output shaft 59. The gear teeth of the first sun gear 80 are coupled to or meshingly engaged with a plurality of straight or spur gear teeth associated with the at least one first planet gear 682 such that the first sun gear 80 drives the at least one first planet gear 682.

In one example, the at least one first planet gear 682 comprises two or more first planet gears 682. For example, the first compound planetary gear set 670 may include four first planet gears 682. In this example, each of the first planet gears 682 comprises a stepped planet gear, and includes a first step 688 and a second step 690. Each of the first step 688 and the second step 690 include a plurality of straight or spur gear teeth, which extend about a perimeter or circumference of the first planet gear 682 at the respective one of the first step 688 and the second step 690. The gear teeth of the first step 688 are coupled to or meshingly engaged with a plurality of straight or spur gear teeth associated with the first output arm 674 to drive the first output arm 674. The gear teeth of the second step 690 are coupled to or meshingly engaged with a plurality of straight or spur gear teeth associated with the first ring gear 686 to drive the first ring gear 686. The gear teeth of the second step 690 are also coupled to or meshingly engaged with the gear teeth of the first sun gear 80 to be driven by the first sun gear 80. The first planet carrier plate 84 supports each of the first planet gears 682 for rotation.

The first ring gear 686 surrounds at least the first step 688 of the first planet gears 682. In one example, the first ring gear 686 includes the plurality of straight or spur gear teeth 696 defined about an inner perimeter or inner circumference of the first ring gear 686, and a plurality of bevel gear teeth 698 defined about an outer perimeter or circumference of the first ring gear 686. The spur gear teeth of the first ring gear 686 are coupled to or meshingly engaged with the spur gear teeth associated with the second step 690 of each of the first planet gears 682 such that the first planet gears 682 drive the first ring gear 686. The bevel gear teeth 698 of the first ring gear 686 are coupled to or meshingly engaged with the plurality of bevel gear teeth of the bevel gear 154 associated with the differential lock subsystem 36. It should be noted that in certain examples, the first ring gear 686 may comprise a crown gear, with the bevel gear teeth 698 defined to extend outwardly from a plane that includes the spur gear teeth 696.

In one example, the second compound planetary gear set 672 includes the second sun gear 100, at least one second planet gear 702, the second planet carrier plate 104 and a second ring gear 706. The second sun gear 100 is coupled to the second reductor output shaft 69 of the second control lane 32 and is driven by the second reductor output shaft 69. The gear teeth of the second sun gear 100 are coupled to or meshingly engaged with a plurality of straight or spur gear teeth associated with the at least one second planet gear 702 such that the second sun gear 100 drives the at least one second planet gear 702.

In one example, the at least one second planet gear 702 comprises two or more second planet gear 702. For example, the second compound planetary gear set 672 may include four second planet gear 702. In this example, each of the second planet gear 702 comprises a stepped planet gear, and includes a first step 708 and a second step 710. Each of the first step 708 and the second step 710 include a plurality of straight or spur gear teeth, which extend about a perimeter or circumference of the second planet gear 702 at the respective one of the first step 708 and the second step 710. The gear teeth of the first step 708 are coupled to or meshingly engaged with a plurality of straight or spur gear teeth associated with the second output arm 676 to drive the second output arm 676. The gear teeth of the second step 710 are coupled to or meshingly engaged with a plurality of straight or spur gear teeth associated with the second ring gear 706 to drive the second ring gear 706. The gear teeth of the second step 710 are also coupled to or meshingly engaged with the gear teeth of the second sun gear 100 to be driven by the second sun gear 100. The second planet carrier plate 104 supports each of the first planet gears 682 for rotation.

The second ring gear 706 surrounds at least the first step 708 of the second planet gears 702. In one example, the second ring gear 706 includes the plurality of straight or spur gear teeth 716 defined about an inner perimeter or inner circumference of the second ring gear 706, and a plurality of bevel gear teeth 718 defined about an outer perimeter or circumference of the second ring gear 706. The spur gear teeth 716 of the second ring gear 706 are coupled to or meshingly engaged with the spur gear teeth associated with the second step 710 of each of the second planet gears 702 such that the second planet gears 702 drive the second ring gear 706. The bevel gear teeth 718 of the second ring gear 706 are coupled to or meshingly engaged with the plurality of bevel gear teeth of the bevel gear 154 associated with the differential lock subsystem 36. It should be noted that in certain examples, the second ring gear 706 may comprise a crown gear, with the bevel gear teeth 718 defined to extend outwardly from a plane that includes the spur gear teeth 716.

The first output arm 674 is coupled to the first compound planetary gear set 670 to be driven by the first compound planetary gear set 670, and the second output arm 676 is coupled to the second compound planetary gear set 672 to be driven by the second compound planetary gear set 672, which provides two separate load paths to the primary flight control surface 22 (FIG. 1). In one example, the first output arm 674 includes a first end that defines a plurality of straight or spur gear teeth 730. The spur gear teeth 730 of the first output arm 674 are coupled to or meshingly engaged with the spur gear teeth of the first step 688 of each of the first planet gears 682. A second end of the first output arm 674 is coupled to the primary flight control surface 22 to move the primary flight control surface 22.

The second output arm 676 includes a first end that defines a plurality of straight or spur gear teeth 740. The spur gear teeth 740 of the second output arm 676 are coupled to or meshingly engaged with the spur gear teeth of the first step 708 of each of the second planet gears 702. A second end of the second output arm 676 is coupled to the primary flight control surface 22 to move the primary flight control surface 22. Generally, each of the output arms 674, 676 may be coupled directly to the primary flight control surface 22 via at least one bolted joint between the respective output arm 674, 676 and internal structure of the primary flight control surface 22, such as an internal rib of the primary flight control surface 22. In addition, alternatively, the output arms 674, 676 may be attached to a system that controls a movement of the primary flight control surface 22 to change the kinematics from simple rotation to more complex movement.

Generally, the first output arm 674 is coupled to the second output arm 676 at the primary flight control surface 22 to ensure that the first output arm 674 and the second output arm 676 move the primary flight control surface 22 in unison. Optionally, the first output arm 674 is coupled to the second output arm 676 directly to ensure that the first output arm 674 and the second output arm 676 move in unison without straining the primary flight control surface 22. The absence of additional torsional strain to the primary flight control surface 22 is beneficial, and may be more favorable than connecting the output arms 674, 676 together via the primary flight control surface 22.

The differential lock subsystem 36 is coupled to the first ring gear 686 and the second ring gear 706, and is in communication with the controller 26. The differential lock subsystem 36 includes the third brake 150, the third speed reductor 152 and a gear coupling in the form of the bevel gear 154. The third brake 150 is coupled to the third speed reductor 152, and is in communication with the controller 26. In one example, the third brake 150 is coupled to an input shaft 156 of the third speed reductor 152, and is responsive to one or more control signals from the controller 26 to inhibit a rotation of the input shaft 156, and thus, the bevel gear 154. The third speed reductor 152 comprises the planetary gear set having the input shaft 156 and the output shaft 158, which is concentric with the input shaft 156. The input shaft 156 of the third speed reductor 152 is coupled to the third brake 150 to enable the third brake 150 to apply a brake torque to inhibit a rotation of the input shaft 156, and thus, the output shaft 158. The output shaft 158 is coupled to the bevel gear 154. It should be noted that in certain instances the third speed reductor 152 may not be present and the third brake 150 may be coupled directly to or connected directly with the output shaft 158.

The bevel gear 154 is coupled to the output shaft 158 so as to rotate with the output shaft 158 and is driven by the first ring gear 686 and the second ring gear 706. Generally, the first ring gear 686 and the second ring gear 706 rotate in opposite directions at about the same velocity due to the coupling of the bevel gear 154 between the first ring gear 686 and the second ring gear 706. The bevel gear teeth 160 of the bevel gear 154 are coupled to or meshingly engaged with the bevel gear teeth 698 of the first ring gear 686 and the bevel gear teeth 718 of the second ring gear 706 such that the first ring gear 686 and the second ring gear 706 drive the bevel gear 154. It should be noted that while a single bevel gear 154 is described and illustrated herein, a pair of bevel gears may be employed.

The third brake 150 is responsive to one or more control signals from the controller 26 to engage and move the differential lock subsystem 36 to a first, locked state in which the rotation of the output shaft 158, and thus, the bevel gear 154 is inhibited. When the rotation of the bevel gear 154 is inhibited, the first ring gear 686 and the second ring gear 706 are also inhibited from rotation and held fixed relative to the actuator housing 38. With the first ring gear 686 and the second ring gear 706 inhibited from rotating, the actuator system 600 is a torque-summing speed reducer in the first, locked state of the differential lock subsystem 36. Conversely, when the third brake 150 is not engaged and the differential lock subsystem 36 is in a second, unlocked state, the bevel gear 154 is free to rotate with the first ring gear 686 and the second ring gear 706. As the first ring gear 686 and the second ring gear 706 rotate in the opposite directions at about the same velocity, the actuator system 600 is a velocity-summing speed reducer in the second, unlocked state of the differential lock subsystem 36.

Generally, when acting as a torque-summing speed reducer, the third brake 150 is responsive to one or more control signals from the controller 26 to engage so that the ring gears 86, 286, 106, 306 are fixed or immovable. With the ring gears 686, 706 fixed or immovable, the first motor 52 and the second motor 62 are responsive to one or more control signals from the controller 26 to drive the respective speed reductor 54, 64. The speed reductors 54, 64 drive the respective sun gear 80, 100. The sun gears 80, 100, in turn, drive the respective planet gears 682, 702, which are supported by the planet carrier plate 84, 104. The planet gears 682, 702, in turn, drive the respective output arms 674, 676 to move the primary flight control surface 22.

When acting as a velocity-summing speed reducer, with the third brake 150 disengaged and the ring gears 686, 706 rotatable in opposite directions, the first motor 52 and the second motor 62 are responsive to one or more control signals from the controller 26 to drive the respective speed reductor 54, 64. The speed reductors 54, 64 drive the respective sun gear 80, 100. The sun gears 80, 100, in turn, drive the respective planet gears 682, 702, which are supported by the planet carrier plate 84, 104. The planet gears 682, 702, in turn, drive the respective ring gears 686, 706 and output arms 74, 76 to move the primary flight control surface 22. It should be noted that while the actuator system 600 is described and illustrated herein as including the ring gears 686, 706 and the differential lock subsystem 36, the ring gears 286, 306 and the differential lock subsystem 206 may also be employed in this arrangement, with the spur gear teeth 296 of the ring gears 286, 306 driven by the second step 690, 710 of the planet gears 82, 102.

With reference back to FIGS. 1-3, 5-6 and 8-9, the controller 26 includes at least one processor 170 and a computer-readable storage device or media 172. The processor 170 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 26, a semiconductor-based microprocessor (in the form of a microchip or chip set), any combination thereof, or generally any device for executing instructions. The computer readable storage device or media 172 may include volatile and nonvolatile storage in read-only memory (ROM), random-access memory (RAM), and keep-alive memory (KAM), for example. KAM is a persistent or non-volatile memory that may be used to store various operating variables while the processor 170 is powered down. The computer-readable storage device or media 172 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 26 in controlling the actuator system 24, 200, 400, 600. In various embodiments, the instructions, when executed by the processor 170, determines a state of operation for the actuator based on whether a fault has been detected and generate one or more output signals to engage or disengage the first brake 50, the second brake 60 and/or the third brake 150. The instructions, when executed by the processor 170, also generate one or more output signals to control the first motor 52 and the second motor 62 based on the desired range of movement for the primary flight control surface 22.

As previously mentioned, the controller 26 is configured to determine a state of operation for controlling the brakes in response to a determined state of the various embodiments of the differential actuator system described above. As a reminder, the differential actuator systems 24, 200, 200.1, 400, 600 employ failsafe brakes, which operate by engaging to prevent or lock shaft rotation of their respective coupled motors or gears when power is removed from the respective brake. The operating mode includes one of the following: Reduced Velocity-Summing, Velocity-Summing, Reduced Torque-Summing, Torque-Summing or Locked based on either normal operations or a fault condition. As used herein, the reduced (or half) velocity-summing mode or the reduced (or half) torque-summing mode indicates that only one of the control lanes drives the differential actuator system. In general, a normal operating state for the differential actuator system when powered ON is a Velocity-summing mode. During one or more fault conditions in a powered ON condition, the controller may control the brakes based on a particular operational condition of the differential actuator system. Table 1 (below) lists several operating conditions and the associated operating mode(s) for the differential actuator system.

TABLE 1

| Operating Condition | Operating Mode(s) | |
| --- | --- | --- |
| Normal Operation | Velocity-Summing | Torque-Summing |
| Jam in Control Lane | Reduced Velocity-Summing | |
| Loss of Motor Control | Reduced Velocity-Summing | Reduced Torque-Summing |
| Power Loss (both motors) | Locked | |
| Drive Disconnect | Reduced Torque-Summing | |
| Loss of Motor Brake Control | Reduced Velocity-Summing | |

In particular, the controller 26 may control the various subsystems of the differential actuator system based on an existing fault condition. Table 2 provides a list of potential fault conditions, the control states of the various components in the differential actuator system, and the operating state implemented by the controller. Those skilled in the art will understand that the list of potential fault conditions Table 2 is not exhaustive and that the Table 2 also does not include all plausible Control States as a controller reaction to listed Fault Conditions.

TABLE 2

| Fault Condition | Control State | | | | | | |
| --- | --- | --- | --- | --- | --- | --- | --- |
| | Brake 1 | Motor 1 | Brake 2 | Motor 2 | Brake 3 | Brake 4 | Operating Mode |
| First motor or First control lane seized/jammed | ENG | OFF | DIS | ON | DIS | DIS | Reduced velocity-summing |
| Second motor or Second control lane seized/jammed | DIS | ON | ENG | OFF | DIS | DIS | Reduced velocity-summing |
| First motor loss of control | ENG | — | DIS | ON | DIS | DIS | Reduced velocity-summing |
| First motor loss of control | DIS | — | DIS | ON | ENG | ENG | Reduced torque-summing |
| Second motor loss of control | DIS | ON | ENG | | DIS | DIS | Reduced velocity-summing |
| Second motor loss of control | DIS | ON | DIS | — | ENG | ENG | Reduced torque-summing |
| First control lane disconnect | ENG | OFF | DIS | ON | ENG | ENG | Reduced torque-sum |
| Second control lane disconnect | DIS | ON | ENG | OFF | ENG | ENG | Reduced torque-summing |
| First brake loss of control | — | OFF | DIS | ON | DIS | DIS | Reduced velocity-summing |
| Second brake loss of control | DIS | ON | — | OFF | DIS | DIS | Reduced velocity-summing |
| First and Second motor loss of control/Loss of Power | ENG | — | ENG | — | ENG | ENG | Locked |
| Third brake loss of control | DIS | ON | DIS | ON | — | ENG | Torque-summing |
| Fourth brake loss of control | DIS | ON | DIS | ON | ENG | — | Torque-summing |
| First spur gear set or inner dual planetary gears seized/jammed | DIS | ON | DIS | ON | ENG | ENG | Torque-summing |
| Second spur gear set or outer dual planetary gears seized/jammed | DIS | ON | DIS | ON | ENG | ENG | Torque-summing |
| First spur gear set or inner dual planetary gears disconnect | DIS | ON | DIS | ON | ENG | ENG | Torque-summing |
| Second spur gear set or outer dual planetary gears disconnect | DIS | ON | DIS | ON | ENG | ENG | Torque-summing |

Generally, the controller 26 outputs the one or more control signals to engage the first brake 50 and to stop the first motor 52 when the first motor 52 is seized or there is a jam in the first control lane 30. Various actuator systems (e.g., differential actuator systems 24, 200, 200.1, 400, and/or 600) then operates at half velocity, as a velocity-summing speed reducer. The controller 26 outputs the one or more control signals to engage the second brake 60 and to stop the second motor 62 when the second motor 62 is seized or there is a jam in the second control lane 32. The differential actuator system then operates at half velocity, as a velocity-summing speed reducer. By acting as a velocity-summing speed reducer when either of the first motor 52 or the second motor 62 are seized, the differential actuator systems is still able to move the primary flight control surface 22.

The controller 26 outputs the one or more control signals to engage the first brake 50 and the third brake 150 when control of the first motor 52 has been lost. The differential actuator system then operates at half torque, as a torque-summing speed reducer. The controller 26 outputs the one or more control signals to engage the second brake 60 and the third brake 150 when control of the second motor 62 has been lost. The differential actuator system then operates at half torque, as a torque-summing speed reducer. By acting as a torque-summing speed reducer when control of either of the first motor 52 or the second motor 62 is lost, the differential actuator systems is still able to move the primary flight control surface 22.

The controller 26 outputs the one or more control signals to engage the first brake 50 or the second brake 60 in an instance of a mechanical disconnect in the respective one of the first control lane 30 and the second control lane 32. The controller 26 also outputs the one or more control signals to engage the third brake 150. The actuator system 24, 200, 400, 600 then operates at half torque, as a torque-summing speed reducer. By acting as a torque-summing speed reducer during a mechanical disconnect, the differential actuator systems are still able to move the primary flight control surface 22.

The controller 26 outputs the one or more control signals to stop the first motor 52 when a loss of the first brake 50 that is engaged occurs. The differential actuator systems then operate at reduced velocity, as a velocity-summing speed reducer. The controller 26 outputs the one or more control signals to stop the second motor 62 when a loss of the second brake 60 that is engaged occurs. The differential actuator systems then operate at reduced velocity, as a velocity-summing speed reducer. By acting as a velocity-summing speed reducer when either of the first brake 50 or the second brake 60 are lost, the differential actuator systems are still able to move the primary flight control surface 22.

When a loss of the first brake 50 or the second brake 60 when the respective one of the first brake 50 and the second brake 60 are disengaged does not impact the performance of the differential actuator systems. When power is lost such that the first motor 52 and the second motor 62 are inoperable, the differential actuator system is locked due to the use of the failsafe first brake 50, the second brake 60 and the third brake 150. By locking, the differential actuator system inhibits a free float of the primary flight control surface 22.

The differential actuator systems (e.g. 24, 200, 200.1, 400, 600) combine the advantages of torque-summing and velocity-summing systems. The differential actuator system may be actively switched between velocity-summing and torque-summing by the controller 26. The differential actuator system is arranged in a way that there is no common load path, so a single mechanical disconnect in any location does not lead to a free-float condition for the primary flight control surface 22. The differential actuator system mitigates these issues at the level of the differential actuator system, so that differential actuator system per primary flight control surface 22 may be used, while satisfying the safety objectives otherwise achievable by using two actuators. The use of one differential actuator systems per primary flight control surface 22 offers substantial weight savings per aerial vehicle 20, a reduction in cost, easier and less expensive maintenance, which results in a reduction of total cost of ownership. In addition, it should be noted that while the differential lock subsystem 36, 206, 206.1 is described and illustrated herein as comprising one or more gears, a differential lock subsystem employed with the differential subsystem 34, 204, 204.1, 404, 604 may comprise an electrically actuated device.

It should be noted that the gear teeth of various gears teeth and output arms are described herein as comprising straight or spur gear teeth that may be configured differently. For example, such gear teeth may comprise helical gear teeth instead of spur gear teeth. Likewise, various gear teeth are described herein as bevel gear teeth that may also be configured differently. For example, such gear teeth may comprise spiral gear teeth or hypoid teeth instead of standard straight bevel gear teeth.

Further, it should be noted that the use of the planet carrier plates with the control lanes is merely an example, and that there are other possible arrangements of compound gear sets, which need not include the planet carrier plates. If the planet carrier plates are not included, then additional support would be required for the planet gears to counteract the net tilting moment. For example, a bearing or a ring may be positioned on an output shaft to support the planet gears radially between the steps or stages of the planet gears.

In addition, it should be noted that the center section 38c, 238c of the actuator housing 38, 238 may be eliminated, such that there is no housing, and the function of the center section 38c, 238c may be provided by at least one of the ring gears and the output arms themselves. Stated another way, in certain embodiments, the actuator system may be devoid of the center section 38c, 238c of the actuator housing 38, 238.

It should be noted that the differential actuator system 24, 200, 200.1 400, 600 as described herein may also include any number of shafts, bearings, etc. that support and enable the operation thereof.

It should be noted that as used herein the term "failsafe brake" denotes any device that is used to controllably inhibit or permit rotation of a rotor or shaft with a defined default state, either inhibiting or permitting the motion.

Further, it should be noted that while the speed reductors described herein are configured as planetary gear sets, one or more of the speed reductors may include, but is not limited to, a planetary gear set, spur gear set, bevel gear set, harmonic gear set, cycloidal gear set, etc.

In this document, relational terms such as inner and outer, upper and lower, left and right, etc. may be used solely to distinguish one entity or action from another entity or action without necessarily requiring or implying any actual such relationship or order between such entities or actions. Numerical ordinals such as first, second, third, etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the claimed subject matter in any way. Rather, the foregoing detailed description will provide those skilled in the art with a convenient road map for implementing the claimed subject matter. It being understood that various changes may be made in the function and arrangement of elements described in the exemplary embodiments without departing from the scope of the subject matter as set forth in the appended claims.

What is claimed is:

1. A differential actuator system for controlling a flight control surface, the system comprising:
    a first control lane subsystem including a first motor for rotating a first drive shaft;
    a second control lane subsystem including a second motor for rotating a second drive shaft;
    a differential subsystem including:
        a first gear set having a first input gear driven by the first drive shaft, a first output gear configured to control the flight control surface, and a first gear train operably coupling the first input gear to the first output gear, wherein the first gear set forms a first load path from the first control lane to the flight control surface;
        a second gear set having a second input gear driven by the second drive shaft, a second output gear configured to control the flight control surface, and a second gear train operably coupling the second input gear to the second output gear, wherein the second gear set forms a second load path, separate from the first load path, from the second control lane to the flight control surface;
    a differential lock subsystem operably coupled to the first gear set and the second gear set, wherein the differential lock subsystem is switchable between a locked state to couple the first and second gear sets in a torque-summing mode for moving the flight control surface and an unlocked state to couple the first and second gear sets in a velocity-summing mode for moving the flight control surface; and
    a controller configured to send control signals to the first and second control lane subsystems and the differential lock subassembly for operating the differential actuator system.

2. The differential actuator system according to claim 1, wherein the first gear set comprises a first compound planetary gear set.

3. The differential actuator system according to claim 2, wherein the first compound planetary gear set further comprises a first sun gear as the first input gear, a plurality of first planet gears driven by the first sun gear, a first carrier plate coupled to and supporting the plurality of first planet gears, and a first ring gear coupled to the plurality of first planet gears, wherein the ring gear is operationally coupled to the differential lock subsystem.

4. The differential actuator system according to claim 2, wherein the second gear set is a second compound planetary gear set.

5. The differential actuator system according to claim 4, wherein the second compound planetary gear set comprises a second sun gear as the second input gear and a plurality of second planetary gears, a second carrier plate configured to support the plurality of second planet gears, and a second ring gear coupled to the plurality of second planet gears, wherein the plurality of second planet gears are operationally coupled to and driven by the second sun gear and the second ring gear is operationally coupled to the differential lock subsystem.

6. The differential actuator system according to claim 1, wherein the first control lane subsystem further comprises a first brake operably coupled to the first motor and in communication with the controller, wherein the controller is configured to engage the first brake to inhibit rotation of the first drive shaft and to disengage the first brake to permit rotation of the first drive shaft.

7. The differential actuator system according to claim 6, wherein the second control lane subsystem further comprises a second brake operably coupled to the second motor and in communication with the controller, wherein the controller is configured to engage the second brake to inhibit rotation of the second drive shaft and to disengage the second brake to permit rotation of the second drive shaft.

8. The differential actuator system according to claim 7, wherein the differential lock subsystem comprises:
a gear coupling operably coupled between the first ring gear and the second ring gear; and
a third brake in communication with the controller and operably coupled to the gear coupling, wherein the controller is configured to engage the third brake to inhibit rotation of the differential gear in the torque-summing mode and to disengage the third brake to permit rotation of the differential gear in the velocity-summing mode.

9. The differential actuator system according to claim 8, wherein the differential lock subsystem further comprises:
a fourth brake in communication with the controller and operably coupled to the gear coupling, wherein the controller is configured to engage the fourth brake to inhibit rotation of the gear coupling in the torque-summing mode and to disengage the fourth brake to permit rotation of the gear coupling in the velocity-summing mode;
wherein the fourth brake is redundant in function to the third brake for operating the differential actuator system in the torque-summing mode or the velocity-summing mode.

10. The differential actuator system according to claim 8, wherein the controller is configured to engage the third brake and disengage the first brake and second brake in the torque-summing mode.

11. The differential actuator system according to claim 10, wherein the controller is further configured to:
detect a reduced functionality in the first control lane;
determine an operational state for the reduced functionality;
engage the third brake to couple the first control lane and the second control lane based on the operational state; and
disengage the first and second brakes to allow the second control lane to drive the second gear set to move the flight control surface in a reduced torque-summing mode.

12. The differential actuator system according to claim 8, wherein the controller is configured to engage one of the first or second brake and disengage the third brake in the velocity-summing mode.

13. The differential actuator system according to claim 12, wherein the controller is further configured to:

detect a reduced functionality in the first control lane;
determine an operational state for the reduced functionality;
engage the first brake to inhibit back driving of the first control lane by the first gear set based on the operational state; and
disengage the second brake and third brake to allow the second control lane to drive the gear set to move the flight control surface in a reduced velocity-summing mode.

14. A differential actuator system for controlling a flight control surface, the system comprising:
a first control lane subsystem including a first motor for rotating a first drive shaft and a first brake operably coupled to the first motor and configured to control rotation of the first drive shaft;
a second control lane subsystem including a second motor for rotating a second drive shaft and a second brake operably coupled to the second motor and configured to control rotation of the second drive shaft;
a differential subsystem including:
a first compound planetary gear set having a first sun gear driven by the first drive shaft, a first planet gear configured to control the flight control surface, and a first gear train operably coupling the first sun gear to the first planet gear, wherein the first compound planetary gear set forms a first load path from the first control lane to the flight control surface;
a second compound planetary gear set having a second sun gear driven by the second drive shaft, a second planet gear configured to control the flight control surface, and a second gear train operably coupling the second sun gear to the second planet gear, wherein the second compound planetary gear set forms a second load path, separate from the first load path, from the second control lane to the flight control surface;
a differential lock subsystem operably coupled to the first compound planetary gear set and the second compound planetary gear set, wherein the differential lock subsystem includes:
a gear coupling between the first compound planetary gear set and the second compound planetary gear set; and
a third brake operably coupled to the gear coupling;
a controller configured to send control signals to the first and second control lane subsystems and the differential lock subassembly for operating the differential actuator system, wherein the controller is configured to send a first set of control signals for engaging the third brake and disengaging the first and second brakes for operating the differential actuator system in a torque-summing mode and to send a second set of control signals for disengaging the first, second and third brakes for operating the differential actuator system in the velocity-summing mode.

15. The differential actuator system according to claim 14, wherein the differential lock subsystem further comprises:
a fourth brake operably coupled to the gear coupling and in communication with the controller, wherein the controller is configured to engage the fourth brake to inhibit rotation of the gear coupling for operating the differential actuator system in the torque-summing mode and to disengage the fourth brake to permit rotation of the gear coupling for operating the differential actuator system in the velocity-summing mode;

wherein the fourth brake is redundant in function to the third brake for operating the differential actuator system in the torque-summing mode or the velocity-summing mode.

16. The differential actuator system according to claim 15, wherein the differential lock subsystem further comprises:
   a first brake gear train set coupled to the first compound planetary gear set and the second compound planetary gear set, wherein the first brake gear train is also coupled with the third brake to control a movement of the first compound planetary gear set and the second compound planetary gear set;
   a second brake gear train set coupled to the first compound planetary gear set and the second compound planetary gear set, wherein the second brake train is also coupled to the fourth brake and configured to operate as a redundant braking system operable in a failure condition to control a movement of the first compound planetary gear set and the second compound planetary gear set.

17. The differential actuator system according to claim 16, wherein the controller is further configured to:
   detect a reduced functionality in the first control lane;
   determine an operational state for the reduced functionality;
   engage the third brake to couple the first control lane and the second control lane based on the operational state; and
   disengage the first and second brakes to allow the second control lane to drive the second gear set to move the flight control surface in a reduced torque-summing mode.

18. The differential actuator system according to claim 14, wherein the controller is further configured to:
   detect a reduced functionality in the first control lane;
   determine an operational state for the reduced functionality;
   engage the first brake to inhibit back driving of the first control lane by the first gear set based on the operational state; and
   disengage the second brake and third brake to allow the second control lane to drive the gear set to move the flight control surface in a reduced velocity-summing mode.

19. The differential actuator system according to claim 14, wherein the controller is configured to send the second set of control signals for engaging one of the first or second brakes and disengaging the third brake to operate the differential actuator system in the velocity-summing mode during normal operating conditions.

* * * * *